(12) United States Patent
Rueger et al.

(10) Patent No.: US 11,612,872 B2
(45) Date of Patent: Mar. 28, 2023

(54) SOOT REMOVAL PROCESS AND ASSEMBLY IN COOLING SECTORS AND RECUPERATORS

(71) Applicant: SunFire GmbH, Dresden (DE)

(72) Inventors: Dietmar Rueger, Bannewitz (DE); Carl Berninghausen, Bremen (DE); Christian Klahn, Finsterwalde (DE); Sebastian Becker, Cologne (DE); Robert Blumentritt, Dresden (DE)

(73) Assignee: SunFire GmbH, Dresden (DE)

( * ) Notice: Subject to any disclaimer, the term of this patent is extended or adjusted under 35 U.S.C. 154(b) by 464 days.

(21) Appl. No.: 16/616,545

(22) PCT Filed: Jun. 11, 2018

(86) PCT No.: PCT/DE2018/100552
§ 371 (c)(1),
(2) Date: Nov. 25, 2019

(87) PCT Pub. No.: WO2018/228641
PCT Pub. Date: Dec. 20, 2018

(65) Prior Publication Data
US 2020/0179897 A1 Jun. 11, 2020

(30) Foreign Application Priority Data
Jun. 12, 2017 (EP) .................... 17175569

(51) Int. Cl.
B01J 19/00 (2006.01)
C25B 1/00 (2021.01)
(Continued)

(52) U.S. Cl.
CPC ....... B01J 19/0026 (2013.01); B01J 19/0013 (2013.01); C01B 3/12 (2013.01);
(Continued)

(58) Field of Classification Search
CPC .............. C07C 29/1518; C01B 3/382; B01J 19/0026; B01J 2219/00247; C10K 3/026
See application file for complete search history.

(56) References Cited

U.S. PATENT DOCUMENTS 4,118,282 A * 10/1978 Wallace ..................... C10J 3/00
208/402
2002/0046889 A1* 4/2002 Kunitake ................ B60L 58/34
429/423
(Continued)

FOREIGN PATENT DOCUMENTS

DE 4235125 A1 4/1994
EP 1717198 A2 11/2006
(Continued)

OTHER PUBLICATIONS

International Search Report dated Oct. 24, 2018, in International Application No. PCT/DE2018/100552.

Primary Examiner — Imran Akram
(74) Attorney, Agent, or Firm — Patent Central LLC; Stephan A. Pendorf

(57) ABSTRACT

Soot removal process at or inside a synthesis gas- and/or CO-containing gas production apparatus using as feed gases carbon dioxide, steam, hydrogen and/or a hydrocarbon-containing residual gas and using electrical energy in RWGS processes, electrolyses for electrochemical decomposition of carbon dioxide and/or steam, reforming operations and/or synthesis gas production processes with at least one gas production unit, an electrolysis stack and/or a heater-reactor combination for performing an RWGS reaction and at least one cooling sector/recuperator for CO-containing gas and/or synthesis gas, and also a soot removal assembly. Formation of soot can be suppressed or prevented during gas cooling
(Continued)

Figure 1:
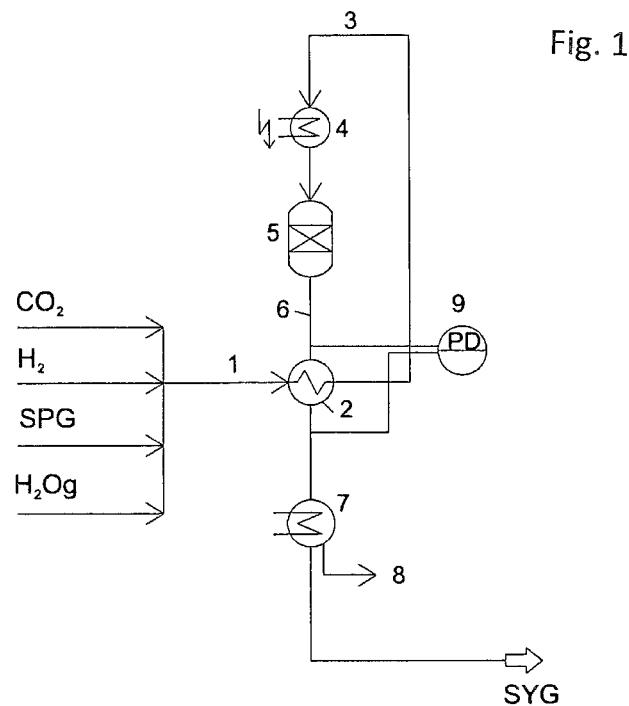

and soot that is nevertheless deposited can be removed again from the heat exchanger surface.

5 Claims, 13 Drawing Sheets

(51) Int. Cl.
  *C01B 3/12* (2006.01)
  *C01B 3/32* (2006.01)
  *C25B 15/02* (2021.01)
(52) U.S. Cl.
  CPC ............ *C01B 3/32* (2013.01); *C25B 1/00* (2013.01); *C25B 15/02* (2013.01); *B01J 2219/00135* (2013.01); *B01J 2219/00247* (2013.01); *C01B 2203/0872* (2013.01)

(56) References Cited

U.S. PATENT DOCUMENTS

| | | | |
|---|---|---|---|
| 2006/0211777 A1* | 9/2006 | Severinsky | C01B 3/16 518/702 |
| 2006/0242902 A1 | 11/2006 | Tautz | |
| 2009/0235587 A1* | 9/2009 | Hawkes | C25B 1/00 48/202 |
| 2009/0307975 A1 | 12/2009 | Wolf | |
| 2011/0301386 A1* | 12/2011 | Mamedov | C07C 29/136 252/373 |
| 2012/0326091 A1* | 12/2012 | Iaquaniello | C01B 3/386 252/373 |
| 2013/0345326 A1* | 12/2013 | Bashir | C07C 27/00 252/373 |
| 2014/0288195 A1* | 9/2014 | Castelli | C07B 41/02 518/700 |
| 2015/0336795 A1* | 11/2015 | Kern | C10J 3/06 252/373 |
| 2016/0052785 A1* | 2/2016 | Maass | C10J 3/18 252/373 |
| 2017/0175277 A1 | 6/2017 | von Olshausen et al. | |
| 2018/0287179 A1 | 10/2018 | Rueger et al. | |

FOREIGN PATENT DOCUMENTS

| | | |
|---|---|---|
| EP | 2049232 B1 | 11/2012 |
| EP | 2520542 A1 | 11/2012 |
| WO | 2008016728 A2 | 2/2008 |
| WO | 2010020358 A2 | 2/2010 |
| WO | 2011133264 A1 | 10/2011 |
| WO | 2013131778 A2 | 9/2013 |
| WO | 2014097142 A1 | 6/2014 |
| WO | 2014154253 A1 | 10/2014 |
| WO | 2015185039 A1 | 12/2015 |
| WO | 2016161999 A1 | 10/2016 |

* cited by examiner

SOOT REMOVAL PROCESS AND ASSEMBLY IN COOLING SECTORS AND RECUPERATORS

The invention relates to a soot removal process at or inside a synthesis gas- and/or CO-containing gas production apparatus using as feed gases carbon dioxide, steam, hydrogen and/or a hydrocarbon-containing residual gas and using electrical energy in RWGS processes, electrolyses for electrochemical decomposition of carbon dioxide and/or steam, reforming operations and/or synthesis gas production processes with at least one gas production unit, an electrolysis stack and/or a heater-reactor combination for performing an RWGS reaction and at least one cooling sector/recuperator for CO-containing gas and/or synthesis gas, and also a soot removal assembly.

It should be noted at this point that an "and/or" link listed in feature lists also applies to the directly associated "," links, for example the feature list "a, b, c and/or d" should be read as "a and/or b and/or c and/or d" in this disclosure.

If hot, CO-containing gases are cooled in a heat exchanger, solid carbon, so-called soot, can be produced in the temperature range of about 300 to 800° C., given the thermodynamic and kinetic conditions.

The following chemical reactions are mainly responsible for soot formation:

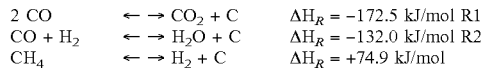

| 2 CO | ←→ $CO_2$ + C | $\Delta H_R$ = −172.5 kJ/mol R1 |
|---|---|---|
| CO + $H_2$ | ←→ $H_2O$ + C | $\Delta H_R$ = −132.0 kJ/mol R2 |
| $CH_4$ | ←→ $H_2$ + C | $\Delta H_R$ = +74.9 kJ/mol |

The formed soot settles on the heat exchanger surface and there leads to a deterioration of heat transfer and obstruction of the flow channels. Soiled heat exchanger surfaces reduce the proportion of heat that can be gained and used from gas cooling. Clogged flow channels increase the flow pressure loss and reduce the gas permeability of the apparatus, which must be compensated by higher compression of the gas. Both thus lead to a deterioration in efficiency and to a deterioration of the economy of the overall process. If the carbon enters into a chemical bond with the construction material of the heat exchanger (carbide formation), this can lead to destruction of the heat exchanger (metal dusting).

The term heat exchanger includes here also pipelines in which the CO-containing gas cools due to insufficient thermal insulation, which also can form soot. In general, heat exchangers in the sense of this disclosure can also be recuperators and the like.

The technical field is the cooling of hot, CO-containing gases after their production in gasification plants, $CO_2$-electrolysis and co-electrolysis, RWGS processes (reverse water gas shift-processes) and/or reformers, which are operated preferably using regeneratively produced electric energy as well as synthesis gas production. The invention is concerned with how the formation of soot can be suppressed or prevented during gas cooling and how soot that is nevertheless deposited can be removed again from the heat exchanger surface.

From the state of the art different arrangements and methods are known with respect to the subject matter of this disclosure.

Figure 8:
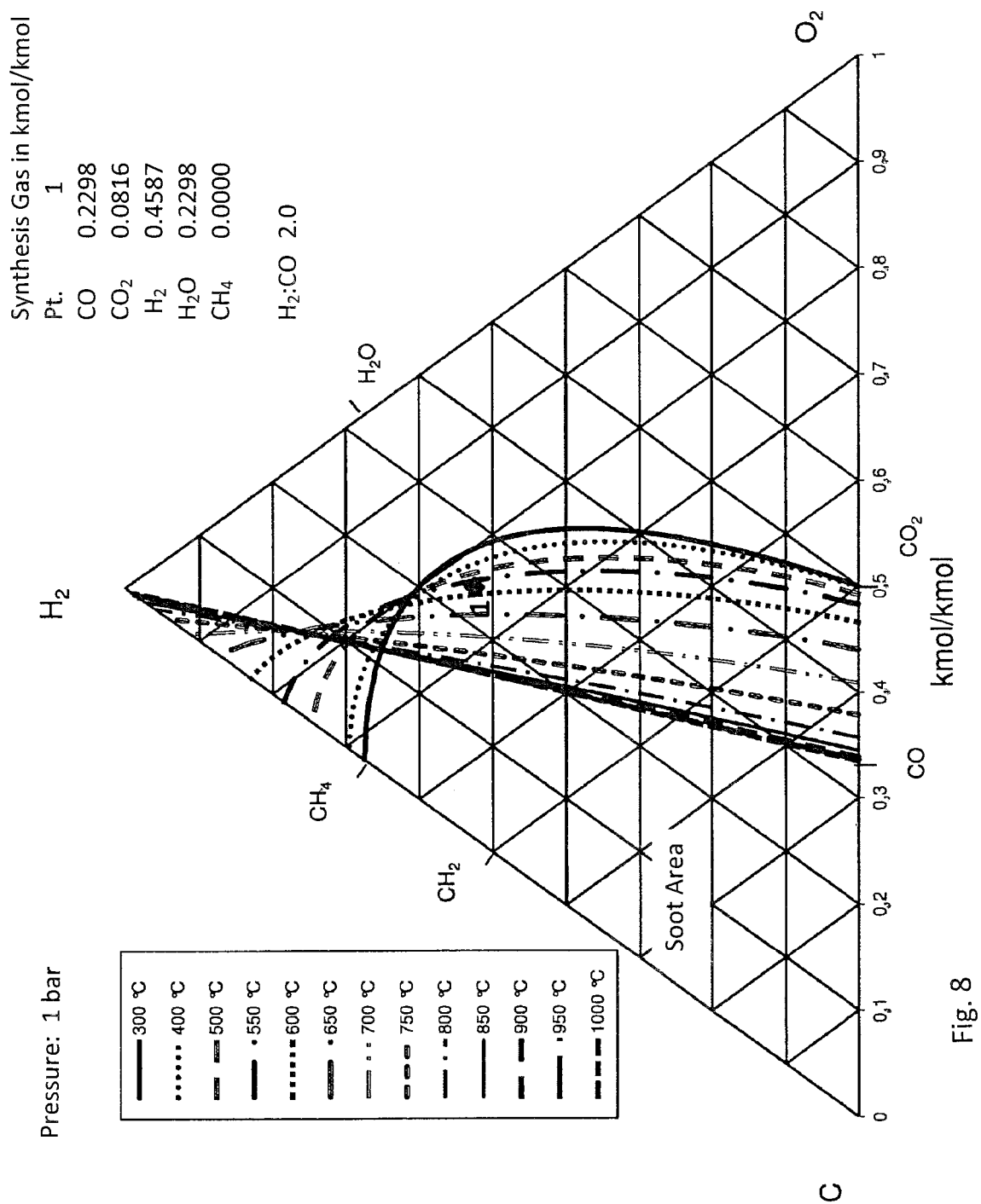

For assessment of the risk of soot formation, in order to illustrate the thermodynamic soot formation conditions, reference is made to the appended FIG. 8, which shows the state of a synthesis gas at any point. The composition of a (synthesis) gas, whose individual gases consist only of the components C, $O_2$ and $H_2$, can be represented as a point (point 1) with the coordinates C, $O_2$ and $H_2$ in the C—$O_2$—$H_2$ state diagram.

The sum of all state points at which a gas mixture at a constant temperature and at a constant pressure (in this case 1 bar) just begins to form soot or in which a gas mixture has reached the limit of absorption capacity of carbon, can be represented as an isotherm (soot boundary at the corresponding temperature).

In the state area to the left of the soot boundary (toward the C corner) there are always 2 phases at once, the gas mixture and the solid soot. That is, the state point is comprised of the composition of the gas mixture and the proportion of the solid carbon.

Figure 9:
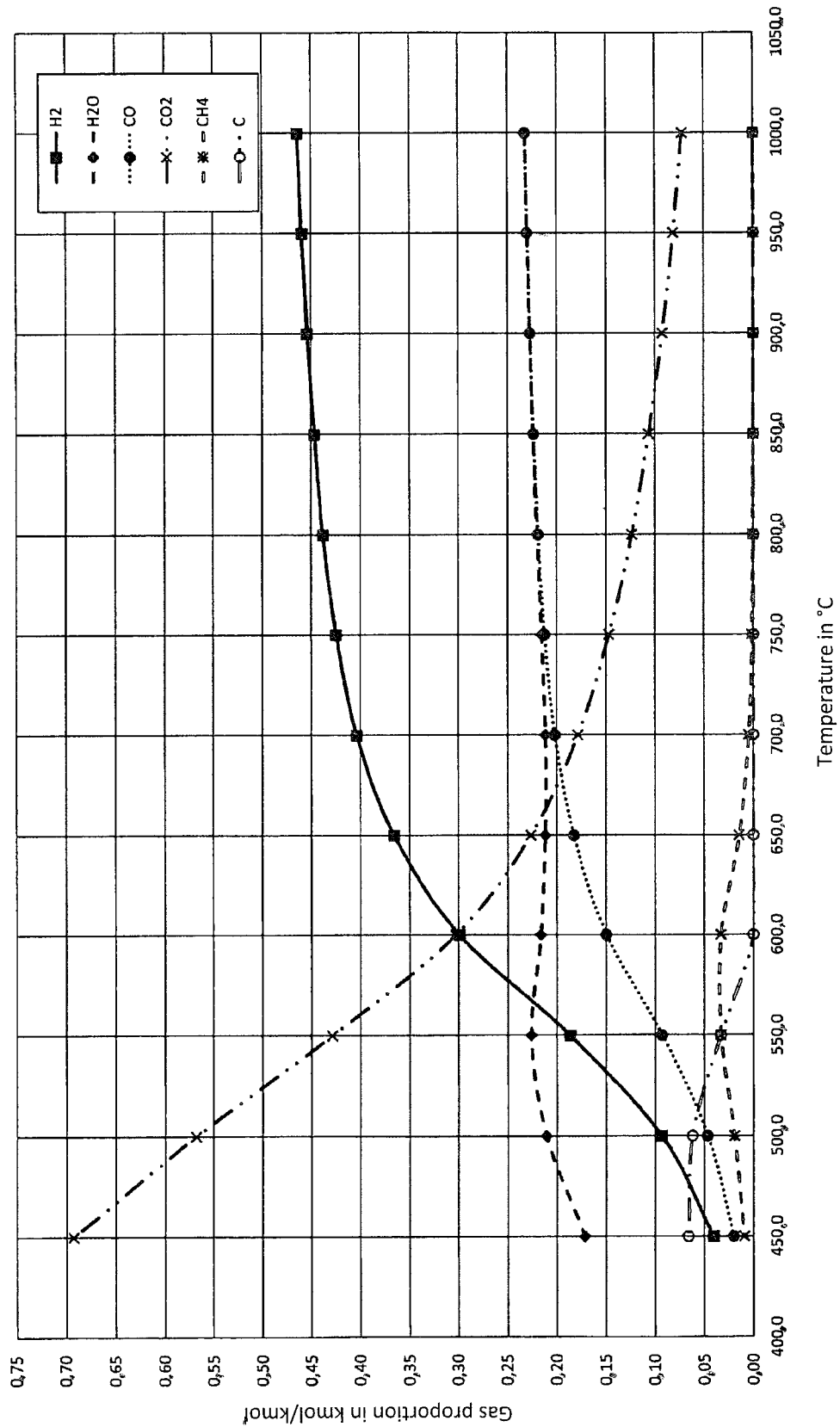
Figure 10:
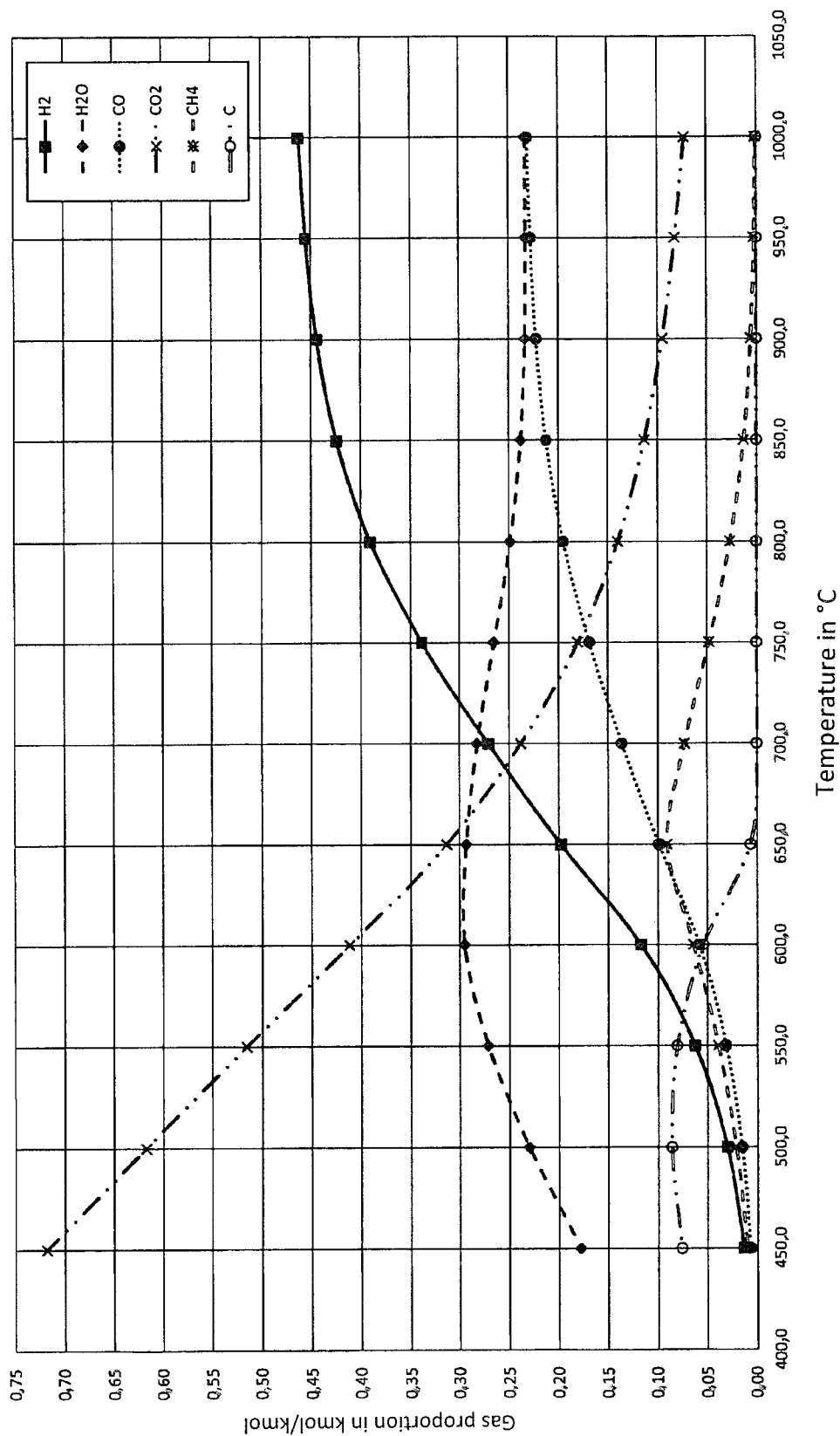

Soot formation is temperature and pressure dependent as the show FIG. 9 and FIG. 10. FIG. 9 shows the synthesis gas composition of an RWGS process as a function of equilibrium temperature at a pressure of 1 bar for a $H_2$—CO molar ratio of 2 and FIG. 10 shows the synthesis gas composition of an RWGS process as a function of equilibrium temperature at a pressure of 10 bar also with a $H_2$—CO molar ratio of 2.

The maximum temperature at which soot is still formed increases at higher pressures and also the amount of soot formed at a given temperature is greater at higher pressures.

In the generation of CO-containing gases, one wants to know whether a gas is in the soot area or not. For example, soot formation during the electrolysis of carbon dioxide in a solid oxide electro-lysing cell (SOEC) can lead to deposits on the electrolysis cells and clogging of the membranes, ultimately stopping the operation of the electrolysis.

The synthesis gas 1 in FIG. 8 should have been generated at 950° C. and 1 bar. The soot limit of 950° C. lies to the left of point 1. This means that the gas is outside the soot area under these conditions.

In the case of an assumed isobaric cooling of the gas in a heat exchanger, the gas composition may still change slightly depending on the rate of cooling and the kinetics of the possible homogeneous and heterogeneous chemical reactions. An equilibrium composition is usually not achieved, since the cooling rates are too high and thus the residence times will be too short. This is not desired, since the gas composition is controlled procedurally, inter alia via the adjustment of the reactor outlet temperature.

However, the position of the state point in the C—$O_2$—$H_2$ diagram remains unchanged, since none of the three components are added to or removed from the system.

The soot limit in the C—$O_2$—$H_2$ diagram applicable for each cooling (intermediate) temperature shifts to the right. At about 570° C. point 1 enters the soot area, assuming the thermodynamic equilibrium state, and remains in this area during further cooling.

Figure 11:
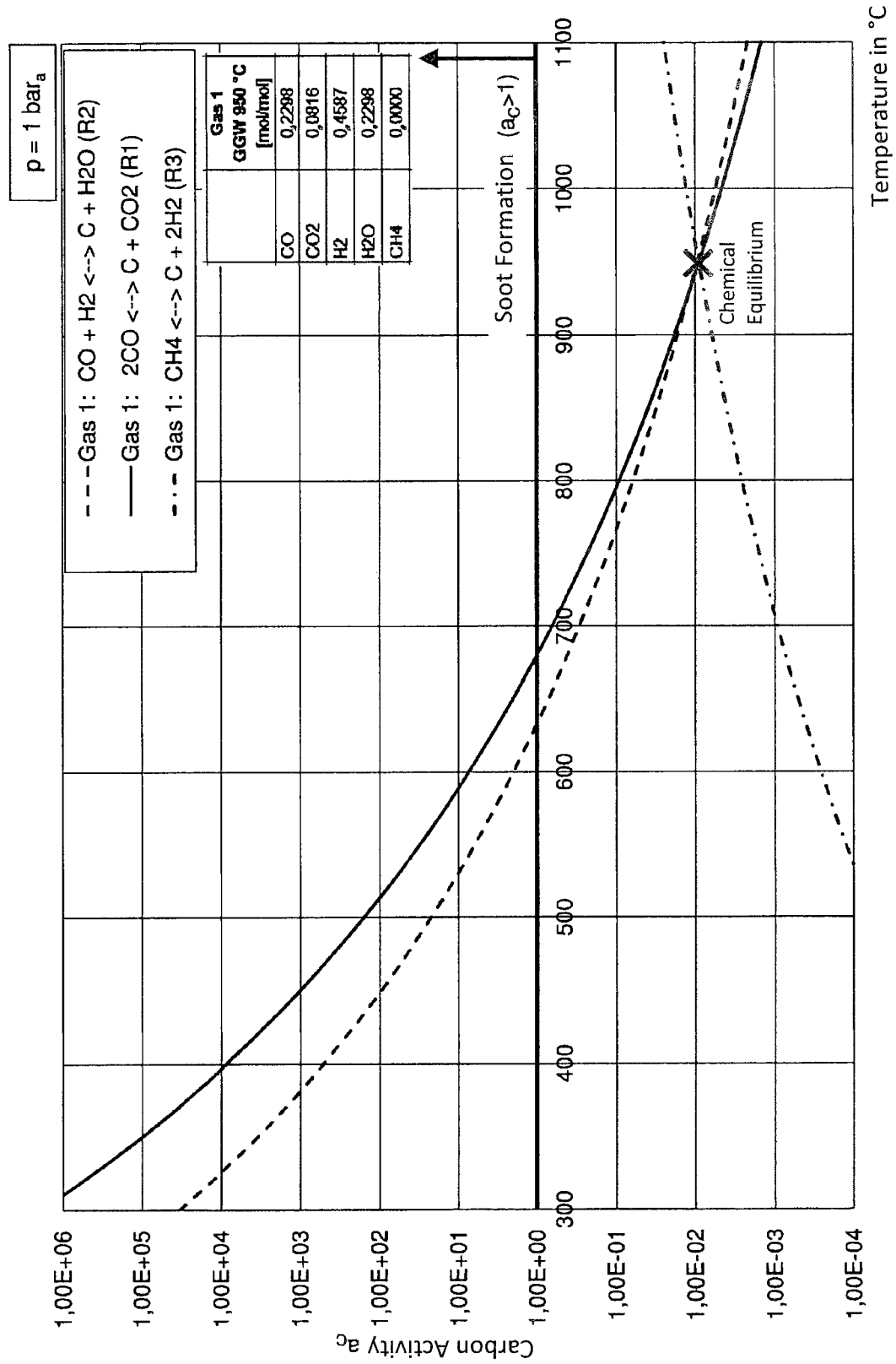

FIG. 11 shows the course of the carbon activities of reactions R1, R2 and R3 starting from gas 1 (analogous to point 1 at 950° C.). Purely thermodynamically with carbon activities of the individual reactions of $a_C \geq 1$ soot formation is assumed, wherein the driving force increases with higher values $a_C$. When $a_C < 1$, the reverse reaction is thermodynamically favored.

With gas composition assumed to be constant, the danger of soot formation by the exothermic Boudouard (R1) and heterogeneous water gas reaction (R2) increases during gas cooling. Throughout the temperature range, soot can be thermodynamically decomposed by reaction R3.

A qualitative statement on the basis of the carbon activities, as to from which starting point temperature soot is formed during the gas cooling, is only possible under the assumption that e.g. reaction R3 is kinetically strongly inhibited. A first soot formation is ideally carried out only from about 680° C. by reaction R1, wherein resulting soot can be consumed by reaction R2 until it thermodynamically forms soot at temperatures less than 630° C.

This approach differs from the C—$O_2$—$H_2$ diagram (soot formation <570° C.), in which, as in a chemical reactor, all the reactants are in thermodynamic equilibrium at all temperatures, but also has the disadvantage that the complex reaction system and the mutual influence of the reactions is disregarded.

Whether and how much soot arises in the overall balance of all participating homogeneous and heterogeneous reactions R1, R2 and R3 depends on whether the kinetics of the individual reactions under the conditions (pressure, temperature, residence time in the heat exchanger, catalytic effect of the construction material, etc.) is sufficiently high.

An assessment of the effectiveness of the measures is possible under consideration of both extreme cases.

In practice, at usual cooling rates and sufficiently high temperatures (>500° C.) experience has shown that soot still forms, which accumulates in the heat exchanger on the heat exchanger surface and in the flow channels in the course of operating time and there leads to problems. Below 350-400° C. at the usual residence times hardly any soot is formed.

For gasification or reforming, the state of the art is carried out according to the following.

In the gasification of coal with air or oxygen, as practiced by Shell, Siemens, Texaco et al., steam is added to the gasification agent to convert the coal completely into a gas without formation of soot. The steam mixture causes the gas composition to be shifted in the direction of $H_2O$ in the state diagram and thus is out of the soot area for the temperatures in question.

In the production of synthesis gas by reforming of hydrocarbons, such as natural gas, as offered for example by Uhde and Linde, the formation of soot in the reformer is also suppressed by excess steam.

In "Diesel Steam Reforming in Microstructured Reactors", J. Thormann, Scientific Reports FZKA 7471, it is recommended to choose the highest possible steam to carbon ratio to avoid soot formation during reforming. However, a high amount of steam is at the expense of efficiency.

The patent EP 1717 198 A2 also states that a high steam excess minimizes soot formation during synthesis gas production.

The cooling of the synthesis gas is generally carried out by quenching with water/steam or cooled and recirculated synthesis gas. The problem of soot formation during cooling of the synthesis gas is however not described in the art of producing CO-containing gases through gasification and reforming.

With regard to the RWGS process, the document EP 20 49 232 B1 of the applicant describes a method with the aim of recirculation of the combustion products carbon dioxide and water, as they occur in the exhaust gases from combustion processes or in the environment, into renewable synthetic fuels and fuels by electrical energy, which was not generated with the help of fossil fuels, but regeneratively. Here, the technical problem is solved by separating off the oxygen, which is chemically bound to carbon and hydrogen in the combustion process, out of the combustion products carbon dioxide and hydrogen under the coupling-in of electrical energy, which was mainly produced by means of renewable energy sources, but not with the aid of fossil fuels, wherein according to the invention hydrogen produced by electrolysis of water, or preferably steam, is mixed with carbon dioxide to a carbon dioxide-hydrogen mixture of up to a molar ratio of 1 to 3.5, this preheated in a high temperature recuperator and then is heated to 800 to 5000° C. in an electrical heating device or an electric plasma generator, the formed synthesis gas is used recuperatively to preheat the carbon dioxide-hydrogen mixture, then is cooled directly with deposition of the reaction water and then the present carbon monoxide-carbon dioxide-hydrogen mixture is supplied to of a Fischer-Tropsch or methanol synthesis and converted there into the product hydrocarbons or methanol, which are cooled with deposition of water and condensed if necessary. Moreover, according to the invention, the recuperative preheating of the carbon dioxide-hydrogen mixture and the further heating thereof takes place by supplying electrical energy in the presence of catalysts. Furthermore, according to the invention, the water used in the gas and product cooling is to be used together with external water for the direct cooling of the synthesis crude gas and the synthesis processes, thereby to vaporize it and to split the steam in electrolysis into hydrogen and oxygen.

In the following reference is first made to the appended FIG. 1 and the below associated description of figures, which shows and explains a schematic representation of a procedural set-up of the RWGS process.

The application of the steam mixture in the gas generation of the prior art, for example in a RWGS process, is shown in the following description with the aid of FIG. 12, namely mixing in of steam in the production of synthesis gas in a RWGS process.

Figure 12:
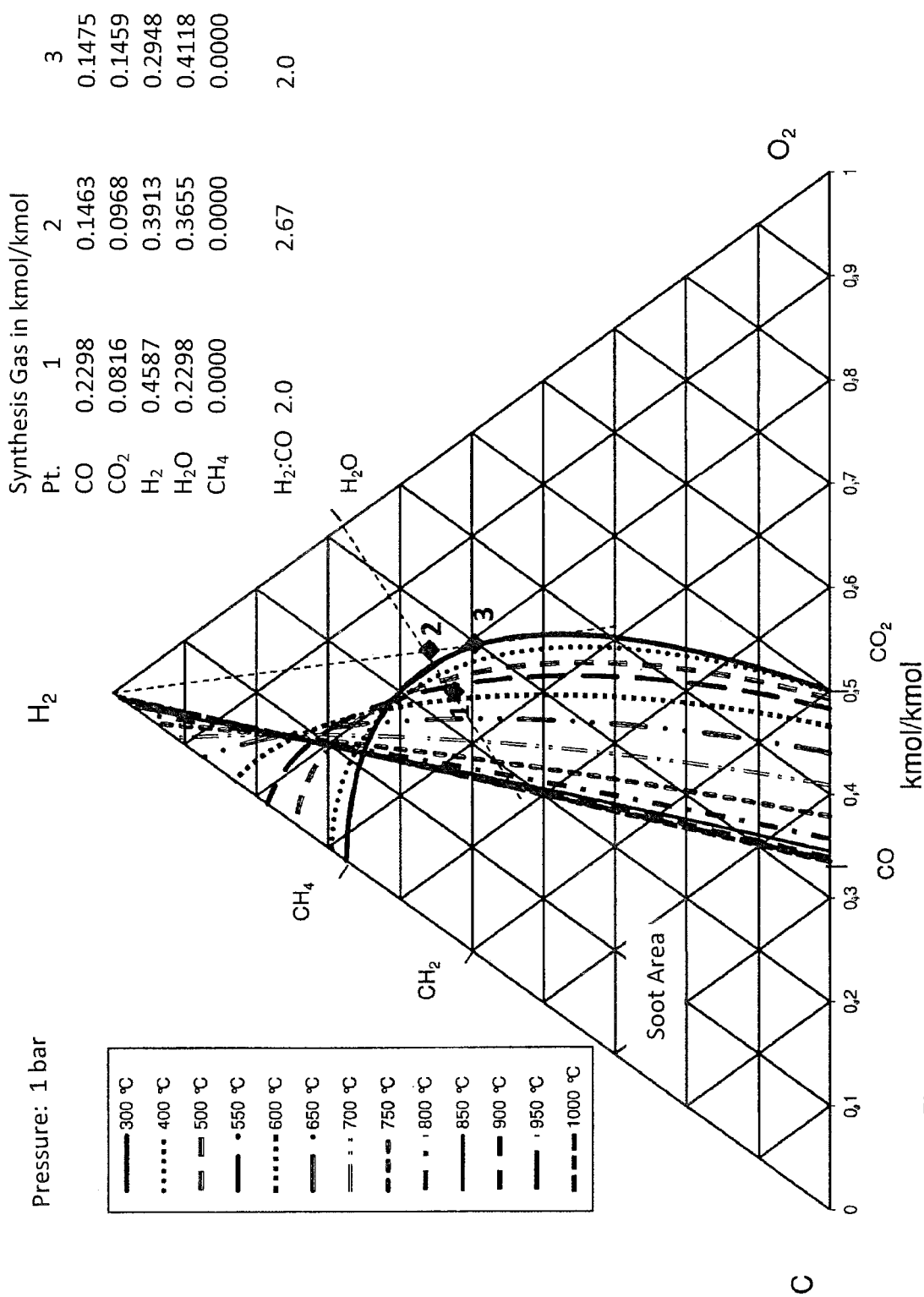

If one mixes the gas in FIG. 12, point 1, which has been generated in an RWGS process from hydrogen and carbon dioxide on a suitable catalyst, for example a nickel catalyst at 950° C. and 1 bar and has a $H_2$—CO molar ratio of 2, steam is mixed-in during the gas production, for example, in that one mixes the feed gases with steam, so the gas composition shifts towards the $H_2O$-point. The amount of steam determines the location of point 2 in the state diagram. In the illustrative example, the state point 2 is only in the soot area at a temperature of <300° C. Due to the very slow kinetics of the soot formation reactions (R1, R2 and R3) at this temperature level, no soot would be likely to form.

The steam participates in the gas conversion reactions in the RWGS process and alters the gas composition, which also leads to a change in the $H_2$—CO molar ratio. To maintain the $H_2$—CO molar ratio of 2, at the same time the amount of $H_2$ feed gas must be reduced. The resulting gas composition is shown by point 3, which reaches the soot area at about 300° C.

On the basis of carbon activities and with neglecting reaction R3, soot can theoretically be produced as soon as the following temperatures are reached:

| Soot formation at T < [° C.] | Point 1 | Point 3 |
| --- | --- | --- |
| Reaction R1 | 680 | 620 |
| Reaction R2 | 630 | 560 |

The soot-reducing effect of the added steam is maintained, but is however lower than in the boundary observation in the thermodynamic equilibrium state according to the C—$O_2$—$H_2$ diagram.

The cost of steam mixing during gas production is a higher $CO_2$ content in the product gas.

With regard to the state of the art for co-electrolysis, reference is made to document WO 2008 016 728 A2, which discloses a method/arrangement for generating a synthesis gas, wherein steam, carbon dioxide, hydrogen and nitrogen produced by nuclear thermal energy are fed directly to a solid oxide electrolysis cell (SOEC) and with the application of nuclear electrical energy are processed electrochemically to synthesis gas with a molar ratio $H_2/CO$ of approximately 2/1.

Further, from the document WO 2011 133 264 a method/arrangement is known for the electrochemical reduction of carbon dioxide to carbon monoxide as product at the cathode and for feeding of a reducing agent to purge the anode A1. On the anode side, by the oxidation of the reducing agent (e.g. hydrocarbons) an efficiency-increasing reduction of the oxygen partial pressure and a heating of the apparatus is achieved. The feed streams are heated recuperatively against the product streams. The invention further comprises the additional supply of steam to produce a synthesis gas.

Furthermore, the document WO 2013 131 778 A2 discloses a method/arrangement for producing high-purity carbon monoxide (>90% by volume) by electrolysis of carbon dioxide, consisting of SOEC stack (<80% conversion) and a special gas separation unit. Other features here are the recirculation of ($CO_2/CO$), the $CO_2$ purge of anode and/or stack housing, the purification of feed $CO_2$ and the pressure increase in front of the gas separation unit. Furthermore, it is recognized that behind the stack during cooling of the $CO_2/CO$ mixture carbon deposits can form on the tube wall of the nickel-based material (Boudouard reaction), which can lead to damage of the material by metal dusting. To prevent C-formation and metal dusting, it is proposed to coat the material with Cu or Ni/Sn or to use Cu insertion tubes.

The document WO 2014 154 253 A1 goes deeper in comparison to the above method/arrangement on the recuperative preheating of the feed gases and proposes further measures to prevent the formation of carbon deposits and metal dusting in the system, namely quenching with inert gas ($CO_2$ or $N_2$) to 400-600° C. to avoid metal dusting, then recuperation for reasons of efficiency and further admixing $H_2S$ in feed and/or downstream to avoid soot formation in the system (50 ppb . . . 2 ppm).

With regard to the co-electrolysis process for the production of synthesis gas according to the state of the art, reference is made to FIG. 2 below, which shows a possible procedural setup of the co-electrolysis process.

Figure 13:
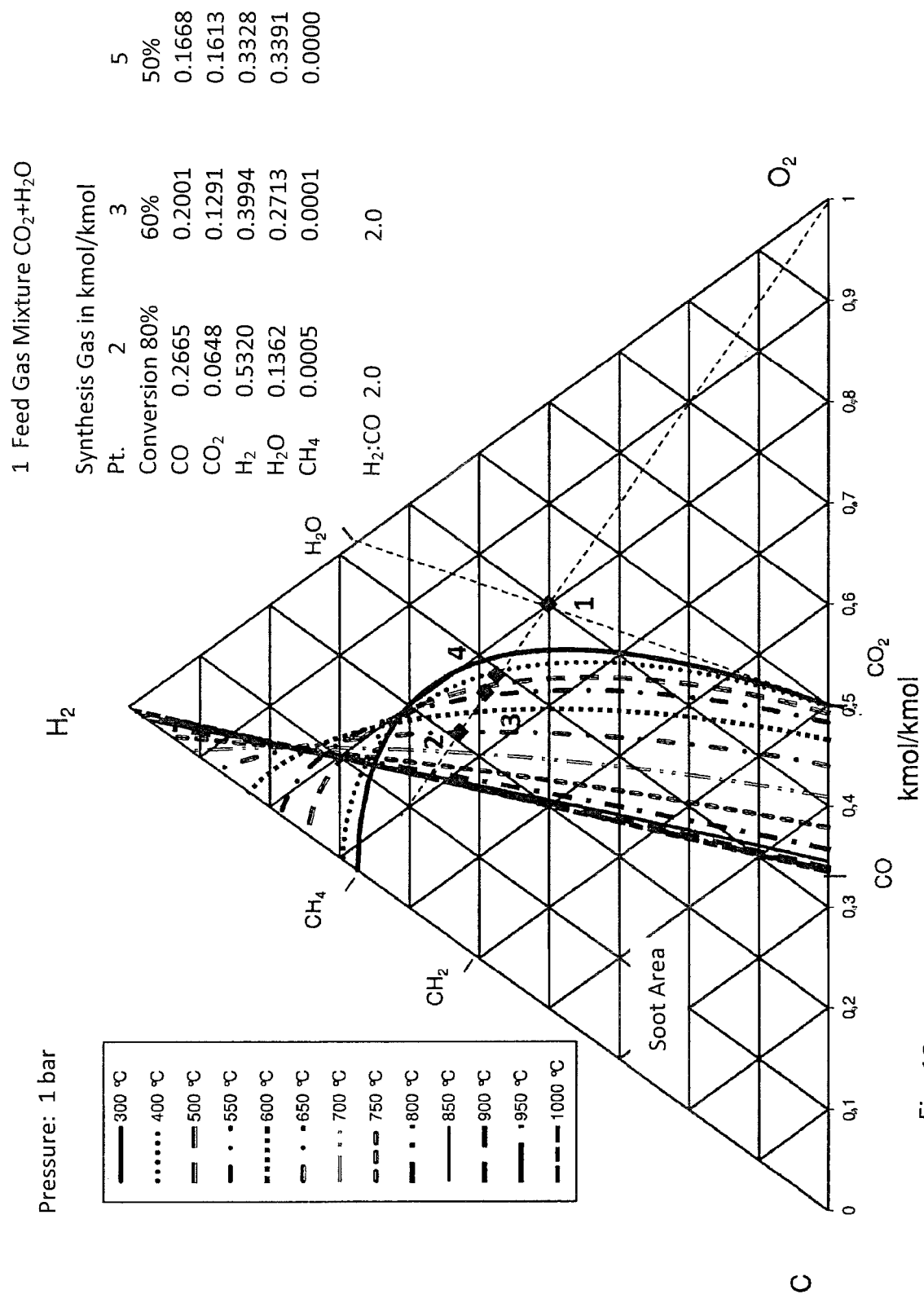
Figure 14:
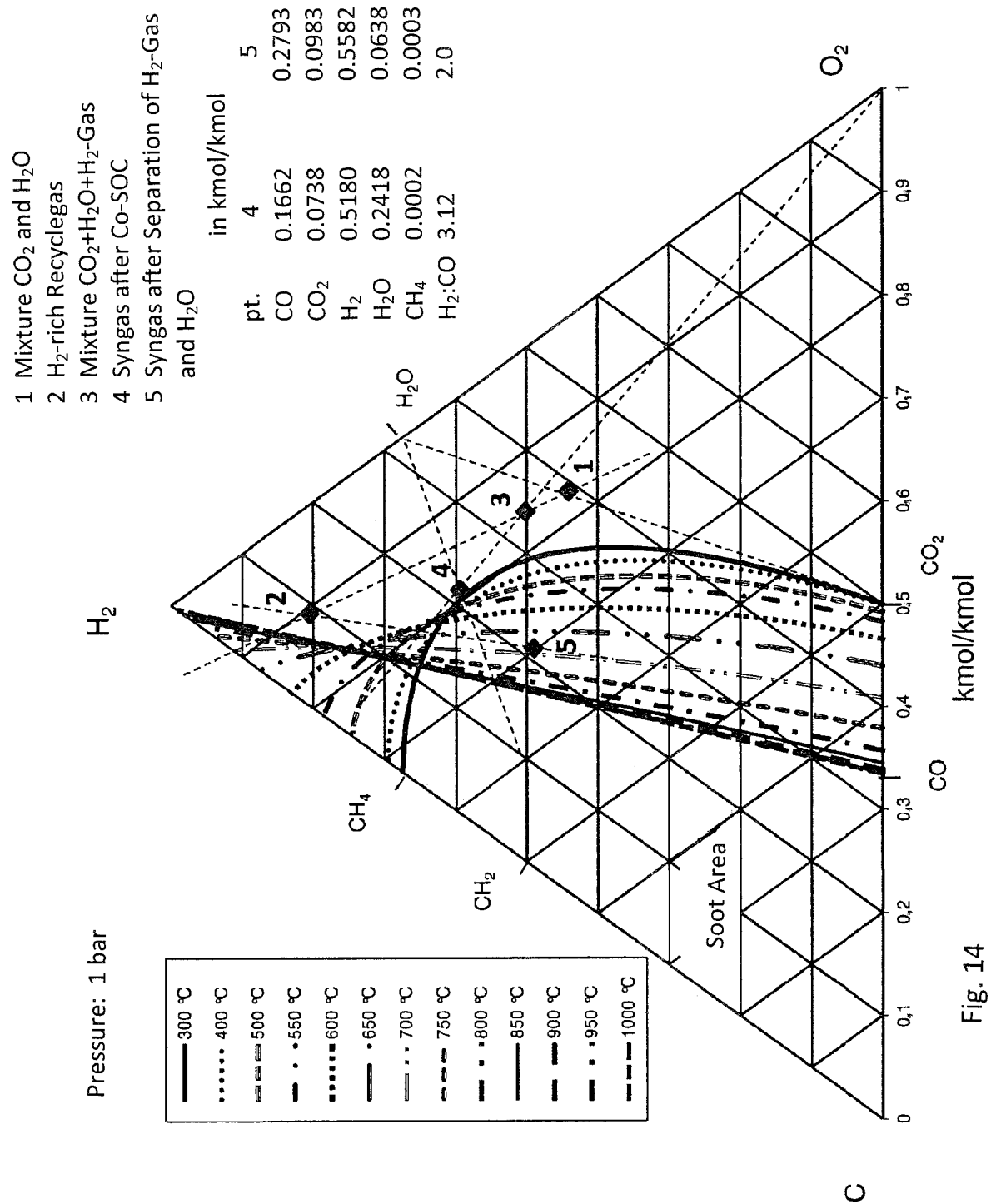
Figure 15:
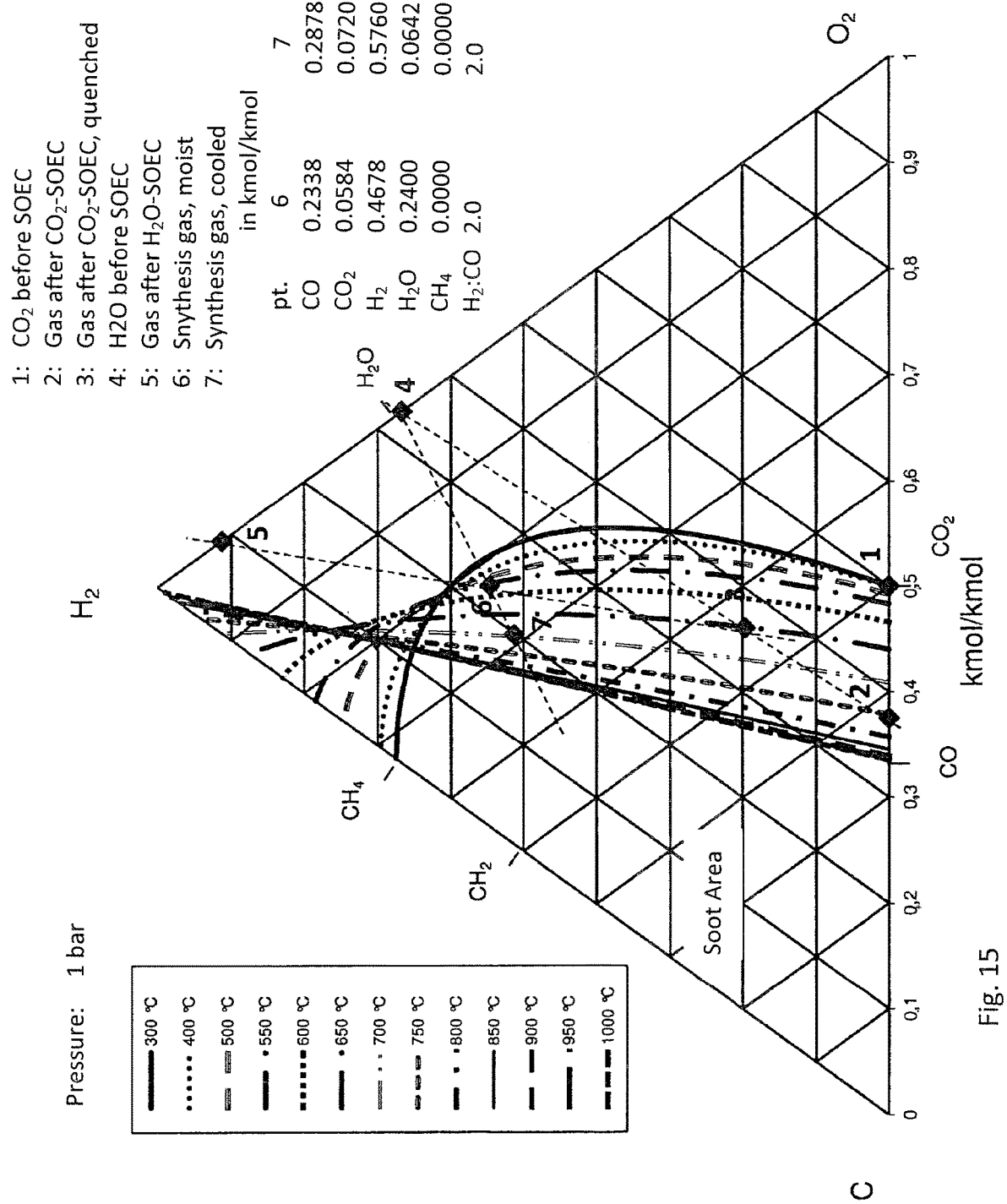
Figure 16:
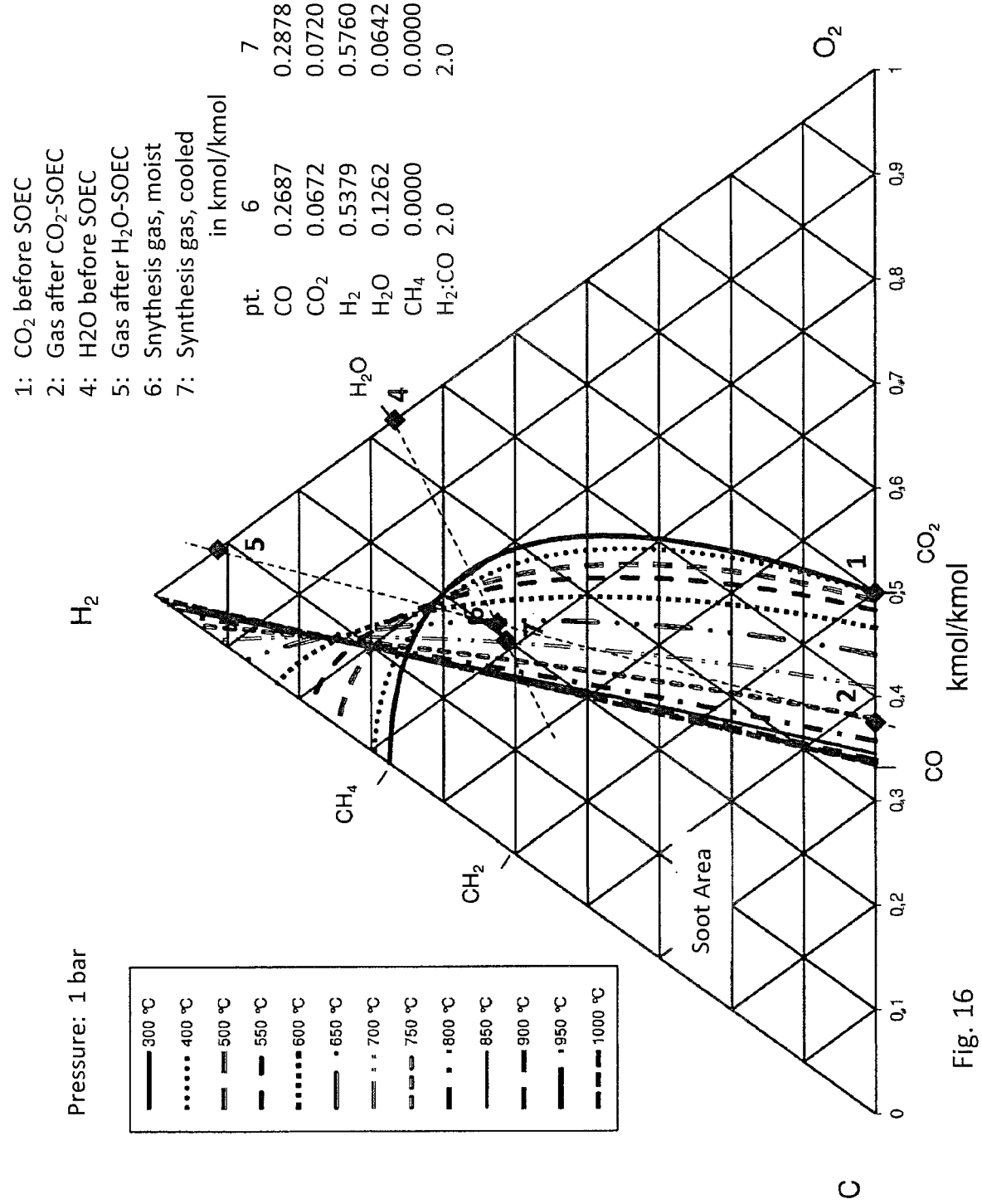

In FIG. 13, which illustrates the state points of synthesis gases from co-electrolysis at different $H_2O/CO_2$ conversions, point 1 shows the feed gas mixture $CO_2$ and steam and point 2 the product gas compositions for 80% conversion.

In the cooling of the feed gas in point 2 passes this enters into the soot area at about 650° C. Any further cooling would lead to soot forming in the heat exchanger.

By reducing the $CO_2$- or $H_2O$-conversion from 80% to 60%, the state point 3 is reached. This point crosses into the soot area at a temperature of 550° C. during gas cooling.

A further reduction of the $CO_2$ and $H_2O$ conversion to 50% is shown by the state point 4. At this point, soot formation would start thermodynamically at about 400° C. during gas cooling, but probably would no longer occur for kinetic reasons.

A reduction in conversions also results in an increase in the $CO_2$ content in the product gas and thus gas deterioration.

The exclusive electrolysis of carbon dioxide, i.e. without steam, can be treated in exactly the same way as the co-electrolysis of carbon dioxide and steam.

On the basis of carbon activities and neglecting reaction R3, soot can theoretically be produced as soon as the temperatures below are reached:

| Soot formation at T < [° C.] | point 2 | point 3 | point 4 |
|---|---|---|---|
| Conversion | 80% | 60% | 50% |
| Reaction R1 | 700 | 650 | 625 |
| Reaction R2 | 680 | 610 | 590 |

The soot-reducing effect of the reduction in conversion is retained, but is lower than in the limit state consideration in the thermodynamic equilibrium state according to the $C$—$O_2$—$H_2$ diagram.

Further, in the prior art there is known for soot removal soot blowing with steam and mechanical soot removal with beaters, bead blasting, brushes, etc.

The following the other known prior art documents are extensively discussed in detail.

From the document WO 2010/020358 A2 a method and a device for soot-free production of synthesis gas from hydrocarbon-containing feed gas and oxygen-containing gas in a multi-stage cascade is known, in which at least one of the stages includes catalytic autothermic reforming and/or catalytic partial oxidation, wherein in each stage of the cascade oxygen-containing gas and hydrocarbon-containing feed gas is supplied, which is converted in each case to hydrogen-containing process gas and passes in series through the entire subsequent cascade. Alternatively, it is a two-stage series arrangement comprising in the first stage an allothermal steam methane reformer, and in the second stage a catalytic autothermal reformer, wherein the second stage receives the hydrogen-containing process gas of the first stage and additionally hydrocarbon feed gas, steam and oxygen-containing gas is supplied, wherein the catalytic autothermal reformer is fed a maximum of 1.5 times the amount of $O_2$, which corresponds to the amount of $H_2$, which is formed in the allothermal steam methane reformer, and the hydrocarbon-containing feed gas and the oxygen-containing gas supplied, separately from each other, to devices that protrude at different levels with different orientation in the last catalytic autothermal reforming stage, wherein the oxygen-containing gas is introduced via at least one separate feed secantly to the center of the circular reactor above the catalyst bed, and the hydrocarbon-containing feed gas is preferably fed axially at the head of the reactor.

Document WO 2010/020358 A2 discloses a multi-stage process for soot-free steam reforming of hydrocarbon-containing starting gases by means of catalytic all-thermal and catalytic auto-thermal reforming. The aim is to prevent soot formation on the catalyst. The reforming of hydrocarbons (here by the example of $CH_4$) with steam is an endothermic process and proceeds according to the following reaction:

$$CH_4 + H_2O \rightarrow CO + 3H_2 \quad \Delta H_R = +206.2 \text{ kJ/mol}$$

Steam is a necessary reaction partner to methane in the process to form CO and $H_2$. By increasing the amount of steam and using the homogeneous steam reaction additional hydrogen can be generated from the CO:

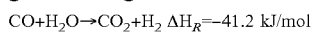
$$CO + H_2O \rightarrow CO_2 + H_2 \quad \Delta H_R = -41.2 \text{ kJ/mol}$$

Here again steam is a main reaction partner. The heat required for the reforming reaction can be supplied externally (allotherm) or generated by partial oxidation of $CH_4$ and/or $H_2$ and/or CO with an oxygen-containing oxidizing agent in the process itself (autotherm).

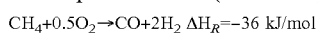
$$CH_4 + 0.5 O_2 \rightarrow CO + 2H_2 \quad \Delta H_R = -36 \text{ kJ/mol}$$

$$H_2 + 0.5 O_2 \rightarrow H_2O \quad \Delta H_R = -242 \text{ kJ/mol}$$

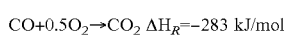
$$CO + 0.5 O_2 \rightarrow CO_2 \quad \Delta H_R = -283 \text{ kJ/mol}$$

In the case of steam or $O_2$ deficiency, there is a risk that soot forms on the catalyst, poisoning the catalyst and thus reducing the catalytic effect.

In the document WO 2010/020358 A2, there is no mention of the cooling of the gas generated in the reforming and thus the soot reduction and in particular soot reduction during cooling. The steam streams 3b, 3c, 3d introduced after gas generation in WO 2010/020358 A2 are the correct amount of steam required in each case before the further reforming stages 1b, 1c and 1d to continue the reforming reactions taking place in these stages. No additional amount of steam is introduced at the end of all process stages in order to suppress or avoid soot formation during gas cooling. The amounts of hydrogen 6a, 6b and 6c introduced into the process stages 1b, 1c and 1d are the amount of hydrogen produced in the preceding process stages and an additional amount of hydrogen is not introduced before or at the end of the overall process to suppress or prevent soot production during cooling of the product gases.

In WO 2010/020358 A2 relates to soot minimization during the production of synthesis gas from hydrocarbon-containing gases by multi-stage allothermic or autothermal steam reforming, in which the supplied steam necessary reaction gas and the subsequent process stages supplied hydrogen is supplied and no additional steam or hydrogen for soot prevention and soot suppression is supplied. Since the disclosure relates only to gas production and not the gas cooling process, the disclosure according to the document WO 2010/020358 A2 does not relate to the present invention.

From the document WO 2015/185039 A1, an electrolysis method with an electrolytic cell using at least one recirculating flushing medium is known. Furthermore, the document concerns an electrolysis arrangement. Steam and/or carbon dioxide is decomposed electrolytically in a SOEC electrolysis into hydrogen, carbon monoxide and oxygen. The product gas $H_2/CO$ is removed from the cathode compartment by means of purge gas (50) and separated into product gas $H_2/CO$, purge gas (50) or purge gas-product gas mixture (50+$H_2/CO$) in the gas separation device located behind the electrolysis. The separated purge gas (50) or the separated purge gas product gas mixture (50+$H_2/CO$) or a portion of the product gas $H_2/CO$ are recycled, mixed with the reactant gas stream prior to electrolysis and again used the cathode side of the electrolysis as a cathode purge gas to remove the electrolysis products $H_2/CO$. The purge gas (50) is inert to the product gas $H_2/CO$. A gas cooling downstream of the electrolysis is not the subject of the invention in D2, but can be used. The rinsing of the cathode side can also be effected by the unreacted portion of the supplied reactant gas ($CO_2/H_2O$), which can also be recycled after gas separation.

The document WO 2015/185039 A1 is concerned with the provision and the effective use of cathode and anode scavenging gas by the use of a gas separation device downstream of the electrolysis, and recycling and reintroduction of the separated purge gas stream as purge gas in the electrolysis. The purge gas does not necessarily have to be $H_2$ or $H_2O$ on the cathode side. It need only be inert to CO and $H_2$ on the cathode side. The document WO 2015/185039 A1 does provide suggestion for the present invention.

The document DE 42 35 125 A1 proposes a process for the production of synthesis gas and an apparatus for carrying out this process. In known processes for the production of synthesis gas fossil materials, such as coal or natural gas, are used as starting materials. This contributes to a further shortage of raw material reserves as well as an increase in $CO_2$ emissions. In the process of the invention, synthesis gas is produced by direct reduction of carbon dioxide to carbon monoxide without using fossil fuels as starting materials. The carbon dioxide is obtained in particular from the atmosphere or from non-fossil emissions, such as cement production emissions. The liquid fuels produced from this synthesis gas, such as methanol, are thus recoverable energy sources of a closed carbon dioxide-fuel cycle.

In document DE 42 35 125 A1, the hydrogen is not intentionally mixed in with the objective to avoid the formation of soot during gas cooling of the produced synthesis gas, but rather in this multi-step process $H_2$ accumulating in the electrodialysis is mixed in the $H_2$—CO-containing synthesis gas from the electrolysis for the final synthesis gas.

The document WO 2014/097142 A1 describes a process for the parallel production of hydrogen, carbon monoxide and a carbon-containing product, which is characterized in that one or more hydrocarbons are thermally decomposed and at least a portion of the resulting pyrolysis gas from the reaction zone of the decomposition reactor is extracted at a temperature of from 800 to 1400° C. and reacted with carbon dioxide to a carbon monoxide and hydrogen containing gas mixture, a synthesis gas.

In the document WO 2014/097142 A1, the hydrogen is not additionally mixed in the generated synthesis gas in order to intentionally avoid the formation of soot in the gas cooling, but serves to set the desired $H_2$:CO molar ratio in the finished synthesis gas. The addition of hydrogen-containing gas mixture from the pyrolysis directly into the gas stream after the RWGS process reduces the amount of CO generatable in the RWGS-step, since heat and $H_2$ for the chemical conversion of $CO_2$ is absent, corresponding to

$$CO_2+H_2 \rightarrow CO+H_2O \; \Delta H_R=+41.2 \; kJ/mol,$$

which in addition also lacks the feature of the electric energy, and therefore this document also does not suggest the method of the present invention.

To summarize the state of the art, it is thus known:
generation of CO-containing gases by RWGS, co- and $CO_2$-SOEC
recuperative preheating of the feed gases or cooling of the hot gases exiting the reactor
recirculation, even after gas separation
measures to prevent soot formation/metal dusting in the system, including cooling sector, in $CO_2$ electrolysis
a. coating of the material (Ni/Sn, Cu)
b. quenching with inert gas ($CO_2$, $N_2$) leads to high cooling tempo
c. $H_2S$ admixture to prevent C formation and metal dusting in the system is known.
steam excess with $H_2O$ addition before the reactor deteriorates gas quality (more $CO_2$).

In the following, the disadvantages and problems in the state it the art are discussed.

In the cooling of CO-containing gases, in particular synthesis gases after generation in RWGS processes, co-electrolysis, electrolysis for the electrochemical decomposition of carbon dioxide, reforming plants, etc., soot forms.

The formed soot settles on the heat exchanger surface and there leads to a deterioration of heat transfer and to a blockage of the flow channels. In particular, the risk of blockage of the flow channels of the gas cooling sectors is usually not of great concern in large plants such as gasification and reformer plants due to the most commonly used quenching, but increases with decreasing plant size (decentralized RWGS or $CO_2$-/co-electrolyzers).

Dirty heat exchanger surfaces reduce the proportion of heat that can be recovered and used from gas cooling.

Clogged flow channels increase the flow pressure loss and reduce the gas permeability of the apparatus, which must be compensated by higher compression of the gas.

If the carbon forms a chemical bond with the construction material of the heat exchanger (carbide formation), this can lead to destruction of the heat exchanger (metal dusting).

Plant shutdowns for cleaning purposes and additional revisions reduce the availability of the system.

The consequences are a deterioration in efficiency, lower availability and thus a deterioration in the efficiency of the overall process.

An increase in the steam content in the feed gas stream leads to a reduction and possibly also an avoidance of soot formation during the gas production and during the gas cooling. The disadvantage of increasing the steam content is that due to the chemical equilibrium during the gas generation more carbon dioxide is formed.

High concentrations of carbon dioxide in the synthesis gas are often undesirable because carbon dioxide is usually not involved in the synthesis reactions and reduces the partial pressure of the synthesis gas components. If the synthesis gas is compressed to higher pressures after gas generation, additional compressor performance is required.

Therefore, complex and expensive gas cleaning processes, such as chemical washes (MEA, MDEA, etc.), physical washings (water scrubbing, Rectisol wash, etc.), pressure swing method, membrane separation method, etc., are required to remove the undesired $CO_2$ in the production of gas from the synthesis gas.

The same effect reduces $H_2O/CO_2$ conversion in co-electrolysis. Here, too, with the reduction of the conversion due to the chemical equilibrium in the gas production in the electrolysis stack, the $CO_2$ content in the synthesis gas increases.

The coating of the catalytically effective heat exchanger surface, for example with Ni/Sn, Cu, suppresses the catalyzed formation of soot and is therefore suitable for extending the operating time between two cleaning cycles. In addition, the layer protects the construction material from metal dusting. However, as experience has shown, a protective layer can not completely prevent soot formation.

An admixture of $H_2S$ is complicated and expensive, since the gas must then be cleaned again in order not to poison the subsequent catalytic synthesis.

Small compact heat exchangers, e.g. plate heat exchangers produced by Heatric, allow high cooling rates, which ensures that the gas temperature quickly reaches a temperature range in which the kinetics for soot formation is too slow. The soot formation rate can, at least, be reduced.

The disadvantage of these heat exchangers, however, is that especially in systems with low power, the cross sections of the flow channels in the heat exchangers are relatively small and thus the risk of clogging of the channels with soot increases.

High cooling rates are also achieved by, among other things, quenching the hot synthesis gas stream with water. Possibly formed soot is usually discharged without problems with the excess quench water from the quencher and can be separated from the water with filters.

The disadvantage of gas quenching is that the sensible heat of the hot synthesis gas is converted into predominantly sensible heat of the quench water at a low temperature level. Thus, this heat is no longer available for preheating the feed gases and must be covered by additional energy supply to the process. The efficiency of the process is deteriorated and the cost of providing energy is increased.

Inert gas quenching, such as $CO_2$ or $N_2$, degrades gas quality and would require expensive gas purification processes.

During sootblowing, an increased amount of gas is given through the heat exchanger for a short time or prolonged time, so that the flow velocity increases and the adhering soot can be blown out. As a result of the increased flow rate, the pressure loss increases considerably through the heat exchanger part. Especially in co-electrolysis with electrolysis cells based on SOC strong pressure fluctuations lead to unacceptably high differential pressures across the electrolysis cells, which leads to the breakage and thus the destruction of the cells.

With some mechanical soot cleaning options, such as the use of brushes, scratches, etc., it is necessary to shut down the synthesis gas plant, which shortens plant availability and uptime.

Knockers for soot cleaning during operation of the system are problematic in that the heat exchangers are used at high gas temperatures 850 . . . 950° C. and a mechanical vibration stress in this temperature range leads to problems in the strength of the materials.

It is an object of the present invention to eliminate the above-mentioned problems and disadvantages of the prior art and to provide a soot removal method and a soot removal arrangement which enable low carbon and high efficiency operation free from soot.

The solution of these objects are achieved with a soot removal process according to the main claim and a soot removal assembly according to claim auxiliary claim.

In general the subsequent soot removal process is proposed in the context of synthesis gas and/or CO-containing gas generating device from the feed gases carbon dioxide, steam, hydrogen and/or a hydrocarbon-containing residual gas and electric energy in RWGS processes, electrolysis for the electrochemical decomposition of carbon dioxide and/or steam, reforming processes and/or synthesis gas production processes with at least one gas generating unit, an electrolysis stack and/or a heater-reactor combination for performing a RWGS reaction, and at least one cooling line/recuperator for CO-containing gas and/or synthesis gas, characterized in that the cooling segment/recuperator is provided with a feed of an oxygen-containing oxidizing agent on the inlet side feed of the CO-containing gas and/or synthesis gas in the cooling sector/recuperator and/or in the feed gas stream to be heated and/or in the oxidizing agent supply an electric auxiliary heater is installed prior to entry into the cooling sector/recuperator, wherein a) the CO-containing gas and/or synthesis gas operation is temporarily interrupted for soot removal and a purge gas or nitrogen is introduced into the cooling segment/recuperator instead of the feed gas together with the oxygen-containing oxidizing agent on the CO-containing gas and/or synthesis gas side, wherein the purge gas or nitrogen stream and/or the oxygen-containing oxidizing agent is heated by the auxiliary heater, thereby heating the cooling sector/recuperator occupied with soot takes place to a temperature above the ignition temperature of soot; or b) the CO-containing gas and/or synthesis gas operation for soot removal is not interrupted and the cooling sector/recuperator is heated by means of the temporarily part time auxiliary heater and the soot deposition in the cooling sector/recuperator is reacted with the CO-containing gas and/or synthesis gas contained residual-$CO_2$ and/or residual $H_2O$; or the CO-containing gas and/or synthesis gas operation is interrupted, wherein the cooling sector/recuperator with soot to be cleaned is closed from the gas generation process on the inlet and outlet side by closing valves intended for this purpose and supplying purge gas in the cooling sector/recuperator to be cleaned with a high gas velocity generated in the cooling sector/recuperator, whereby the soot is blown out of the cooling sector/recuperator and is discharged from the process via an open gas discharge of the cooling sector/recuperator.

According to the invention, the soot removal process on or within a synthesis gas and/or CO-containing gas generating device from the feed gases carbon dioxide, steam, hydrogen and/or a hydrocarbon-containing residual gas and electric energy in RWGS processes, electrolysis for the electrochemical decomposition of carbon dioxide and/or steam, reforming processes and/or synthesis gas production processes with at least one gas generation unit, an electrolysis stack and/or a heater-reactor combination for carrying out a RWGS reaction, and at least one cooling line/recuperator for CO-containing gas and/or synthesis gas, is characterized in that electric energy operated auxiliary heater is installed in the feed gas stream to be heated prior to entering the cooling sector and/or in the recuperator, the CO-containing gas and/or synthesis gas operation is not interrupted for soot removal and the cooling sector/recuperator is heated by means of a temporarily connectable additional heater and the soot deposition in the cooling sector/recuperator is reacted with the CO-containing gas and/or synthesis gas containing residual $CO_2$ and/or residual $H_2O$.

In one possible refinement, the soot removal method can be further configured such that:
the cooling sector/recuperator is designed with a supply for an oxygen-containing oxidizing agent on the inlet side of the CO-containing gas and/or synthesis gas into the cooling sector/recuperator and
an electric energy powered auxiliary heater is installed in the oxidizing agent supply, wherein
the CO-containing gas and/or synthesis gas operation for soot removal is temporarily interrupted and
a purge gas or nitrogen is introduced into the cooling sector/recuperator on the CO-containing gas and/or synthesis gas side, instead of the feed gas, together with the oxygen-containing oxidizing agent,
wherein the purge gas or nitrogen stream and/or the oxygen-containing oxidizing agent is heated by the auxiliary heater, whereby a heating of the soot-occupied cooling sector/recuperator to a temperature above the ignition temperature of the soot takes place.

Furthermore, the soot removal process can be designed to interrupt the CO-containing gas and/or synthesis gas operation, wherein
the cooling sector/recuperator to be cleaned of soot is separated from the gas generation process on the inlet and outlet side by closure of valves provided for it, and
feeding of purge gas in the cooling sector/recuperator to be cleaned with a high gas velocity generated in the cooling/recuperator,
wherein the soot is blown from the cooling sector/recuperator and discharged from the process via an open gas discharge of the cooling sector/recuperator.

In one embodiment, at least two cooling sectors/recuperators can be connected in parallel, wherein at least one cooling sector/recuperator is operated in CO-containing gas operation and/or synthesis gas operation and one cooling/recuperator is at least temporarily driven in the soot removal operation, and wherein the CO-containing gas operation and/or synthesis gas operation is interrupted on the cooling line/recuperator to be cleaned and continued without interruption on at least one parallel arranged second cooling sector/recuperator or operated in parallel.

In this regard, at least two recuperators connected in parallel can be provided to increase the efficiency, wherein the recuperator to be cleaned is reacted, burned off and/or blown free, and the reaction gas after the soot is reacted and/or burned off is supplied to the CO-containing gas operation and/or synthesis gas operation recuperator in the flow direction.

Furthermore, the cooling-off section/recuperator to be cleaned off can be heated by means of a high-temperature auxiliary heater surrounding the cooling-down section/recuperator for heating the cooling-down section/recuperator.

Furthermore, the $CO_2$ and/or $H_2O$ content in the CO-containing gas and/or synthesis gas can be increased ahead of the cooling line/recuperator to be cleaned for the duration of the soot removal by the following measures, namely
supply of additional $CO_2$, steam or $CO_2$/steam mixture, preheated by means of an auxiliary heater before the cooling sector to be cleaned/recuperator;
reducing the $CO_2/H_2O$ or $CO_2$-degree of decomposition in the co-electrolysis or $CO_2$-electrolysis;
reducing the reaction final temperature in a heater-reactor combination suitable for carrying out the RWGS reaction and/or
switching the recuperator sides on the media side by exchanging the feed gas for the CO-containing gas and/or synthesis gas side and the CO-containing gas and/or synthesis gas on the feed gas side.

With regard to the assembly, the soot removal arrangement is, in particular in conjunction with a soot removal process disclosed herein, within a synthesis gas and/or CO-containing gas generating device from the feed gases carbon dioxide, steam, hydrogen and/or a hydrocarbon-containing residual gas and electric energy in RWGS processes, electrolysers for electrochemical decomposition of carbon dioxide and/or steam, reforming processes and/or synthesis gas production processes with at least one gas generating unit, an electrolysis stack and/or a heater-reactor combination for carrying out a RWGS reaction, and at least one cooling line/recuperator for CO-containing gas and/or synthesis gas, characterized in that
the cooling/recuperator is provided with a supply device for an oxygen-containing oxidizing agent on the inlet side and/or CO-containing gas and/or synthesis gas on the outlet side of the cooling sector/recuperator and/or an auxiliary heater operated with electric energy is installed in the feed gas stream to be heated before entering the cooling/recuperator and/or in the oxidation means supply,
and/or
a disruption device for soot removal is provided within the cooling sector/recuperator, the cooling sector/recuperator is temporarily separated from the process plant, wherein the cooling sector/recuperator to be cleaned of soot is separable from the gas generation process on inlet and outlet sides with closable valves,
and/or
a gas removal means is provided on the outlet side and/or the inlet side of the CO-containing gas and/or synthesis gas of the cooling sector/recuperator for discharging the reaction gas and/or the purge gas and the soot from the cooling sector/recuperator and/or the process.

Soot removal by burning with $O_2$-containing oxidizing agent with interruption of the synthesis gas operation:

In order to remove the soot formed in the gas cooling sector of a plant for the production of synthesis gas from carbon dioxide, steam and/or hydrogen and a hydrocarbon synthesis gas and electrical energy from at least one gas generating unit, such as a co-electrolysis stack or a heater-reactor combination for carrying out the RWGS reaction, and a recuperative synthesis gas cooling, it is proposed to provide the cooling sector with an oxygen-containing oxidizing agent port on the synthesis gas upstream side of the recuperator.

Furthermore, an auxiliary heater operated with electric energy is installed in the feed gas stream to be heated before it enters the recuperator and in the oxidizing agent feed.

To eliminate the soot deposits the synthesis gas operation must be interrupted. Instead of the feed gases, nitrogen or another suitable gas is used as purge gas.

In order to heat the entire soot-coated recuperator to a temperature above the ignition temperature of soot, the heater in the supplied purge gas before the recuperator is put into operation to heat the purge $N_2$ and thus the subsequent recuperator to the desired temperature.

A recuperator-enclosing high-temperature auxiliary heater can support the heating of the recuperator.

In the hot purge gas after the gas generating unit, which is kept at a temperature above the ignition temperature of soot during the cleaning process by the heater belonging to the gas generator, an oxygen-containing oxidizing agent, such as an air-$N_2$ mixture, is added before entry of the purge nitrogen in the recuperator. So that the temperature of the purge gas-oxidizing agent mixture does not fall below the ignition temperature of soot after mixing the oxygen-containing oxidizing agent, either the oxygen-containing oxidizing agent is also heated by heating to a temperature above the ignition temperature of soot, or the temperature of the hot purge gas after the gas generating unit ensures a sufficiently high mixing temperature of the gases.

By setting flow rates of purge gas and oxidizing agent, setting oxygen content in the oxidizing agent and setting temperature of the gas mixture in front of the recuperator to be cleaned, it is ensured that the combustion temperature of the soot at no point in the recuperator exceeds the maximum allowable temperature of the recuperator.

The oxygen in the hot, supplied purge gas-oxidizing agent mixture reacts with the soot carbon deposited in the recuperator which is thus degraded to carbon monoxide or carbon dioxide.

After completion of the combustion process, the process is switched back to synthesis gas operation.

This form of soot combustion is feasible both with a recuperator and with multiple, parallel or series-connected recuperators in the gas cooling sector.

In the case of two parallel recuperators in the gas cooling sector, the oxygen-containing oxidizing agent can also be supplied to the closed outflow side of the one recuperator, heated to a temperature above the ignition temperature of soot. It first flows through the blocked off recuperator and burns off the soot in it and then mixes with the purge gas from the gas generating unit. Subsequently, the gas mixture flows forward through the second recuperator, heated to a temperature above the ignition temperature of soot, and burns off the soot from there.

Soot removal by burning with $O_2$-containing oxidizing agent without interruption of the synthesis gas operation:

At a plant for the production of synthesis gas from carbon dioxide, steam and/or hydrogen and a hydrocarbon synthesis gas and electrical energy, which plant includes at least one gas generating unit, such as a co-electrolysis stack or a heater-reactor combination for carrying out the RWGS reaction, and a recuperative synthesis gas cooling, to eliminate the formed soot in the gas cooling sector, it is proposed, in order not to interrupt the synthesis gas operation during soot combustion, to provide the cooling sector with a second parallel, recuperative cooling sector and with a connection for an oxygen-containing oxidizing agent respectively on the synthesis gas downstream side of the recuperators.

Furthermore, additional electric heaters are installed in the heated feed gas streams before entering the recuperators and in the oxidizing agent feeds.

In order not to overburden the generated synthesis gas with nitrogen, the oxygen-containing oxidizing agent preferably comprises an oxygen-carbon dioxide or an oxygen-steam mixture or an air-carbon dioxide or an air/steam mixture.

In synthesis gas operation, the feed gases are heated separately in both, parallel recuperators against a respective partial stream of the synthesis gas to be cooled.

To burn off soot in the recuperators, the synthesis gas outflow side of one recuperator is first shut off. Thus, the entire synthesis gas to be cooled flows only through the remaining recuperator. In order to replace the lack of heat of the feed gas flow through the closed recuperator and to heat the entire closed recuperator to a temperature above the ignition temperature of soot, the auxiliary heater is put into operation in the corresponding feed gas stream.

A recuperator-enclosing high-temperature auxiliary heater can support the heating of the recuperator.

If the recuperator to be cleaned is heated to the required temperature, the oxidizing agent supply and the heating of the oxidizing agent are brought into operation to a temperature above the ignition temperature of soot.

The amount, the oxygen content in the oxidizing agent and the temperature of the oxidizing agent are adjusted so that the combustion temperature of the soot in the recuperator and the combustion temperature of the synthesis gas after the recuperator at no point exceeds the maximum allowable temperature.

The oxygen in the hot, supplied oxidizing agent reacts with the carbon soot deposited in the recuperator which is thus degraded to carbon monoxide or carbon dioxide. The hot combustion gas mixes with the synthesis gas from the gas generating unit and exits via the second recuperator. After completion of the combustion, the process is switched back to synthesis gas operation.

The procedure in second recuperator is carried out analogous to the first recuperator.

The finished synthesis gas has a slightly higher $CO_2$ content during the soot combustion than in normal operation, but this is tolerated by most syntheses, e.g. Fischer-Tropsch synthesis.

Soot removal by reaction with its own $H_2O/CO_2$ content in the gas during synthesis gas production:

In order to eliminate the soot formed in the gas cooling sector of a plant for the production of synthesis gas from carbon dioxide, steam and/or hydrogen as well as a hydrocarbon synthesis gas and electrical energy, which plant includes at least one gas generating unit, such as a co-electrolysis stack or a heater-reactor combination for carrying out the RWGS reaction, and a recuperative synthesis gas cooling, it is proposed to install an electric auxiliary heater in the feed gas stream to be heated before entering the recuperator to heat the recuperator and to react the soot deposition in the recuperator with the residual $CO_2$ and residual $H_2O$ contained in the reactive gas according to the reverse of the reactions R1 and R2.

The heating temperature should be selected to be of such a height, for example 750 to 850° C., that the kinetics of the reactions R1 and R2 allow soot decomposition with a sufficiently high reaction rate.

A recuperator-enclosing high-temperature auxiliary heater can support the heating of the recuperator.

Once the soot is removed, the auxiliary heater can be taken out of service again.

It is further proposed to increase the $CO_2$ and $H_2O$ content in the synthesis gas in front of the recuperator to be cleaned for the duration of the soot removal by the following measures and thus to support the reaction according to the reversals of the reactions R 1 and R 2:

supply of additional $CO_2$, steam or $CO_2$/steam mixture preheated by means of an auxiliary heater in front of the recuperator to be cleaned;

a reduced $CO_2/H_2O$-decomposition degree in CO electrolysis;

a reduced final reaction temperature in heater-reactor combination suitable for carrying out the RWGS reaction;

media-side change of heat exchanger side (feed gas ($CO_2+H_2O$) to synthesis gas side, synthesis gas to feed gas side).

The gas at point 1 in the state diagram FIG. 8 was generated at 950° C., and arrives, upon gas cooling to a temperature of about 570° C., into the soot region and forms soot in the heat exchanger, which settles there.

In order to remove the soot from the heat exchanger again, it is proposed that the gas in certain time intervals or when reaching the maximum allowable pressure drop in the heat exchanger due to soot deposition is temporarily not or only slightly cooled, i.e. for the gas in point 1 to flow through the heat exchanger with a temperature >570° C., preferably much higher.

This can be achieved, for example, if the gas to be heated in the heat exchanger during normal operation is preheated to a temperature >570° C. with the aid of an electric heater. The heat not dissipated from the CO-containing gas then has to be dissipated in a cooler connected to the heat exchanger and operated with cooling water, which ensures a significantly faster gas cooling and thus prevents soot formation.

During cooling and final cooling of the synthesis gas in the water cooler, the excess steam condenses out. The formed liquid water also ensures, by a washing effect, that no soot gets stuck in this cooler.

Due to the high temperature of the hot synthesis gas, the composition is far outside of the soot region. Thus, the gas is able to convert carbon (soot) and hydrogen (reversing reactions R1 and R2) with the help of the gas constituents carbon dioxide and steam.

The further the gas temperature is from the soot limit corresponding to the gas composition, the higher the driving force is (see FIG. 8).

If the pressure loss in the heat exchanger returns to normal, normal recuperation operation can be initiated.

Soot Removal by Soot Blowing:

In order to eliminate the soot formed in the gas cooling sector of a plant for the production of synthesis gas from carbon dioxide, steam and/or hydrogen and a hydrocarbon synthesis gas and electrical energy, the plant including at least one gas generating unit, such as a co-electrolysis stack or a heater-reactor combination for carrying out the RWGS reaction, and a recuperative synthesis gas cooler, it is proposed to not interrupt the synthesis gas operation in soot removal, to provide the cooling sector with a second parallel, recuperative cooling sector and on the synthesis gas inlet side of the cooling sector respectively to provide connections for the supply of purge gas. The cooling sectors on the synthesis gas side are provided with shut off at the inlet and outlet and each have on the synthesis gas outlet side of the recuperators a gas discharge with a dust filter discharging into the atmosphere. If no soot cleaning is provided, the cooling sectors can be operated alternately but also simultaneously.

The feed gas to be heated flows through the two recuperators sequentially. There is no provision for alternating operation, but with additional controls and instruments it can be designed for an alternating operation.

Each purge gas supply can have an additional heater, which prevents a reduction in the heating power of the feed gas during cleaning.

For the soot removal in a gas cooling sector, this is shut off on the inlet and outlet side by closing the designated valves from the gas production process. The synthesis gas flows completely over the second, parallel, not shut off gas cooling sector.

By supplying a purge gas in a sufficient amount so that high gas velocities occur in the recuperator, which can be preheated in the auxiliary heater, the soot is blown from the recuperator and discharged via the open gas discharge on the synthesis gas outlet side of the recuperator out of the process to the atmosphere. The soot dust contained in the purge gas is separated in the filter and collected in a container.

After cleaning, the blow-out valve is closed and the gas cooling sector can be reused by opening the two shut-off valves.

The cleaning of the second parallel gas cooling path is carried out analogous to the first routine.

The process requires two parallel heat exchangers, of which only one must be in operation at first. The other heat exchanger is shut off from the synthesis gas production process and is either just in the process of being cleaned by soot blowing, is cleaned and in reserve, or can also be in operation.

If the heat exchanger in operation has reached its maximum permissible pressure drop due to soot deposits, the "clean" heat exchanger is switched into the process and the synthesis gas flow is diverted from the dirty heat exchanger to the clean heat exchanger. Subsequently, the contaminated heat exchanger is separated from the process and cleaned by soot blowing.

It is also conceivable that with increasing pressure loss of the heat exchanger in operation, a continuous deflection of the synthesis gas stream to the second, clean heat exchanger takes place.

In an RWGS process with two parallel heat exchangers, which is not as sensitive to pressure as the co-electrolysis process, the synthesis gas stream of one heat exchanger is transferred to the other heat exchanger, for example, at regular intervals. Due to the increased amount of synthesis gas and thus higher gas velocity in the heat exchanger, the soot is blown out. This method can be performed reciprocally. In the time when no synthesis gas flows through the shut-off heat exchanger, the heated feed gas must be heated by an electric heater.

This measure can also be supported by the addition of supplemental gas (steam, recycled synthesis gas, etc.).

Overall, the following advantages of this invention are apparent:
- the main focus of the decentralized synthesis gas production by co-electrolysis/RWGS is thus applicable to gasification/reforming;
- highly efficient decentralized synthesis gas generation processes;
- efficiency increasing reduction in the formation of carbon deposits in the synthesis gas cooling (fouling/clogging, pressure losses) without additional use of chemicals;
- increasing plant availability through the most integrated and non-stop off-reaction/removal of carbon deposits;
- increasing the economics of synthesis gas production by reducing OPEX;

as well as
- improvement of gas quality at $H_2$ excess.

Figure 2:
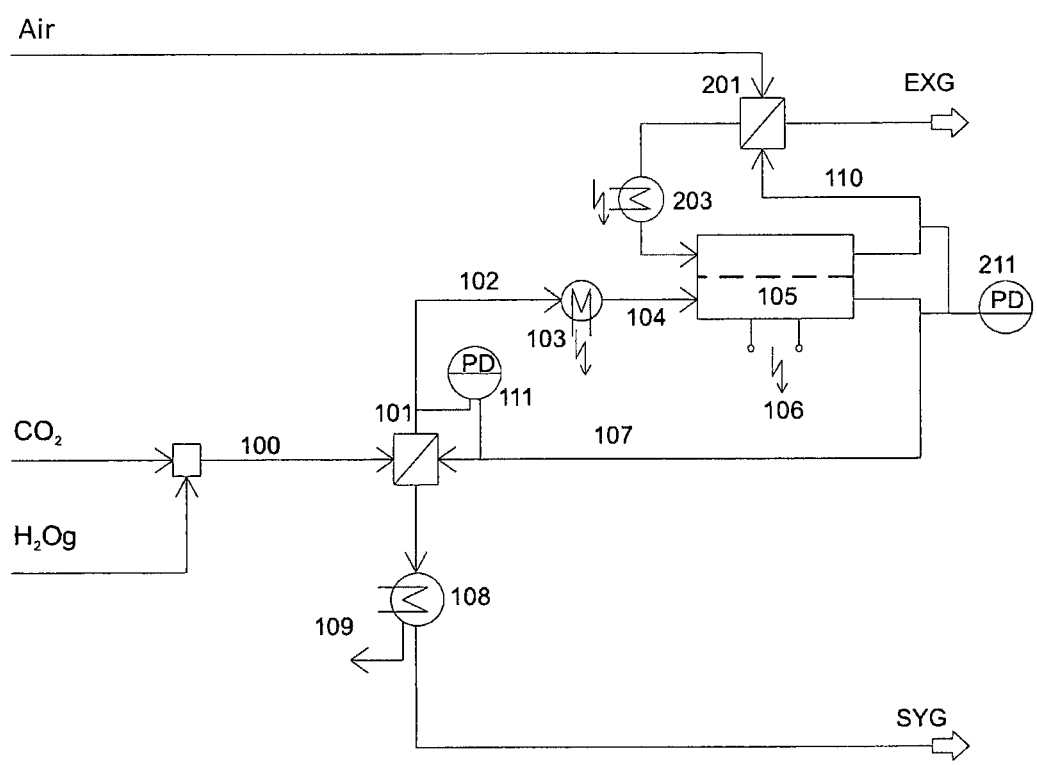
Figure 3:
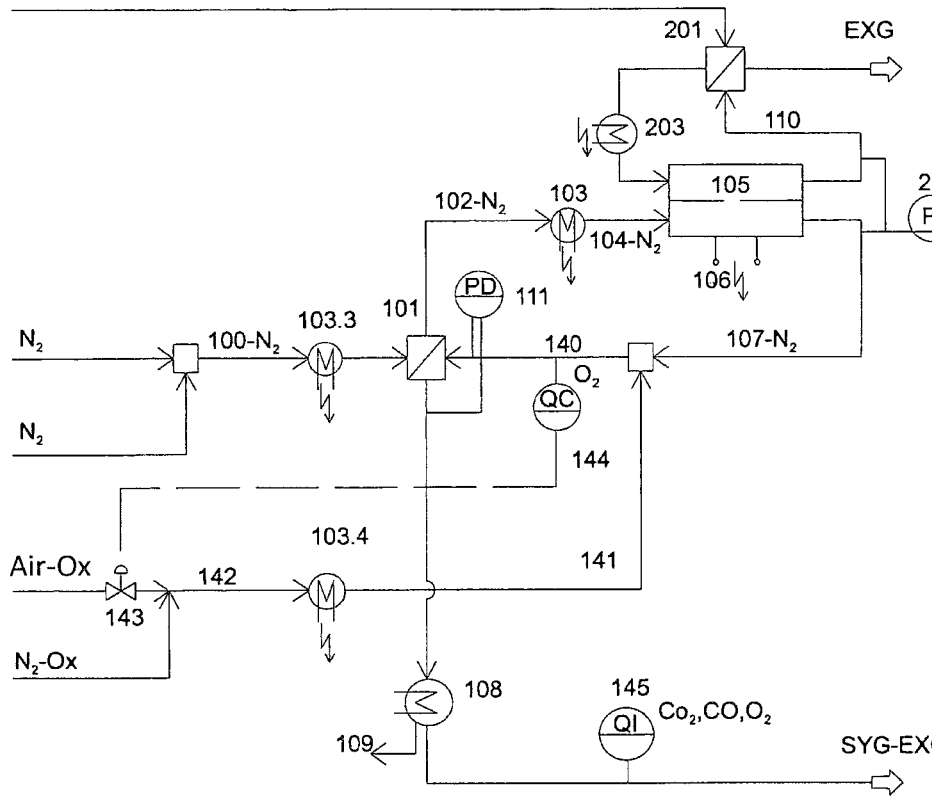
Figure 4:
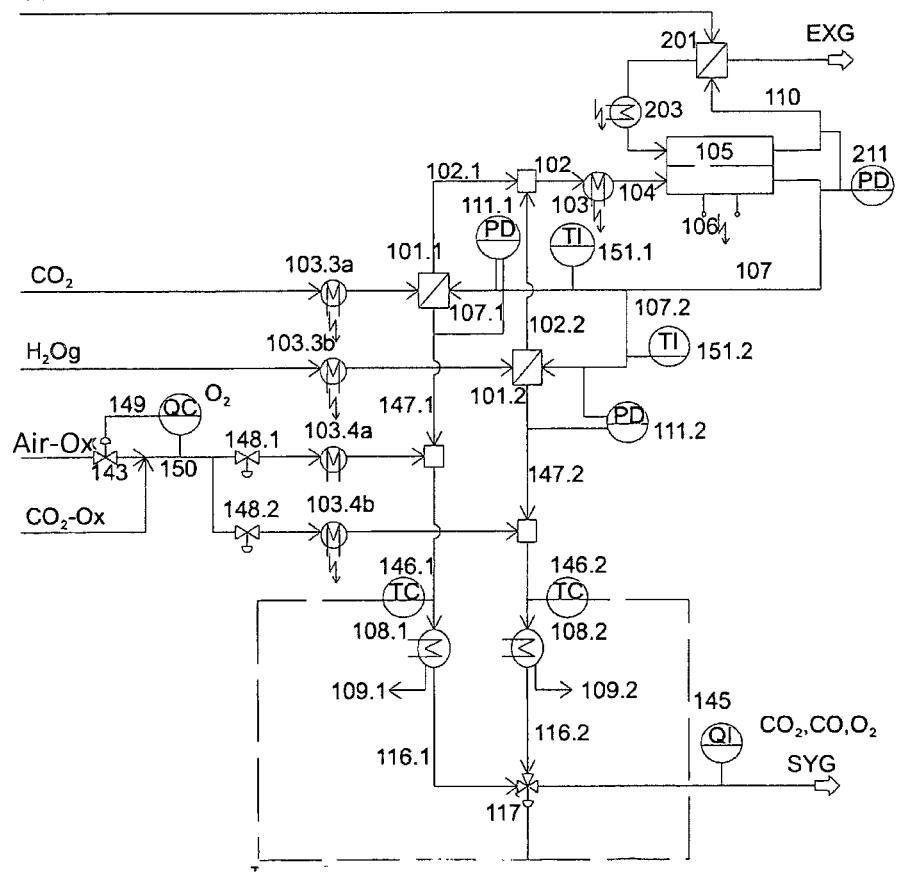
Figure 5:
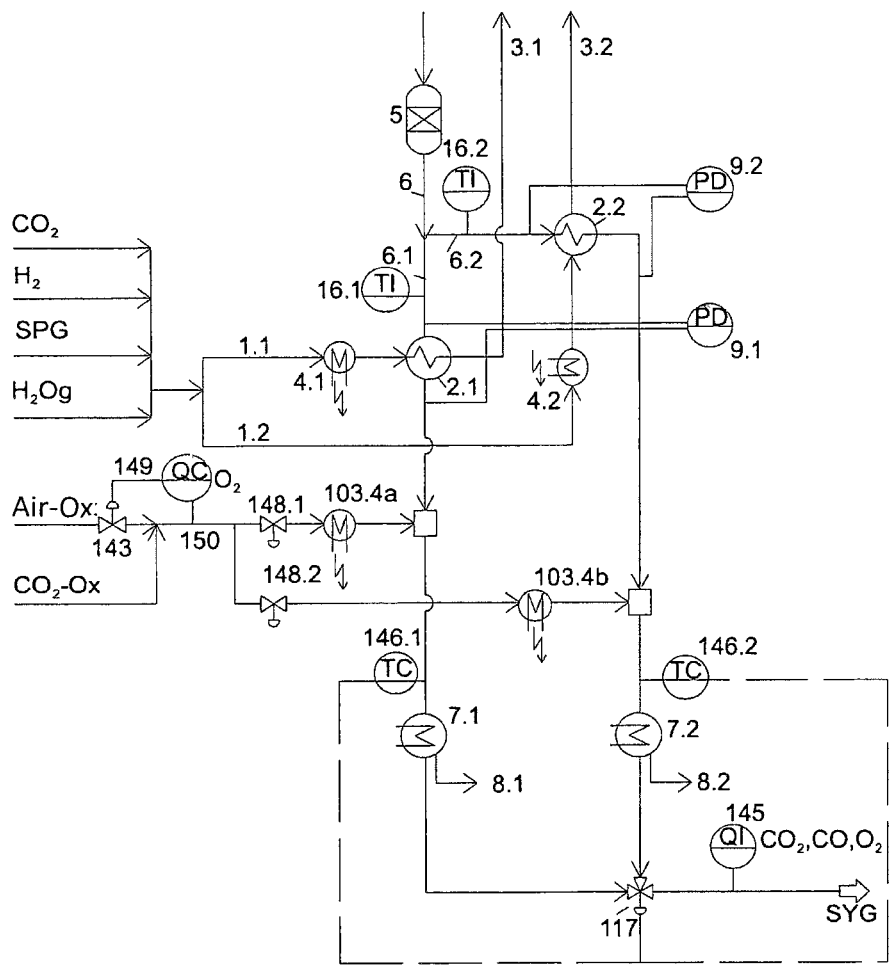
Figure 6:
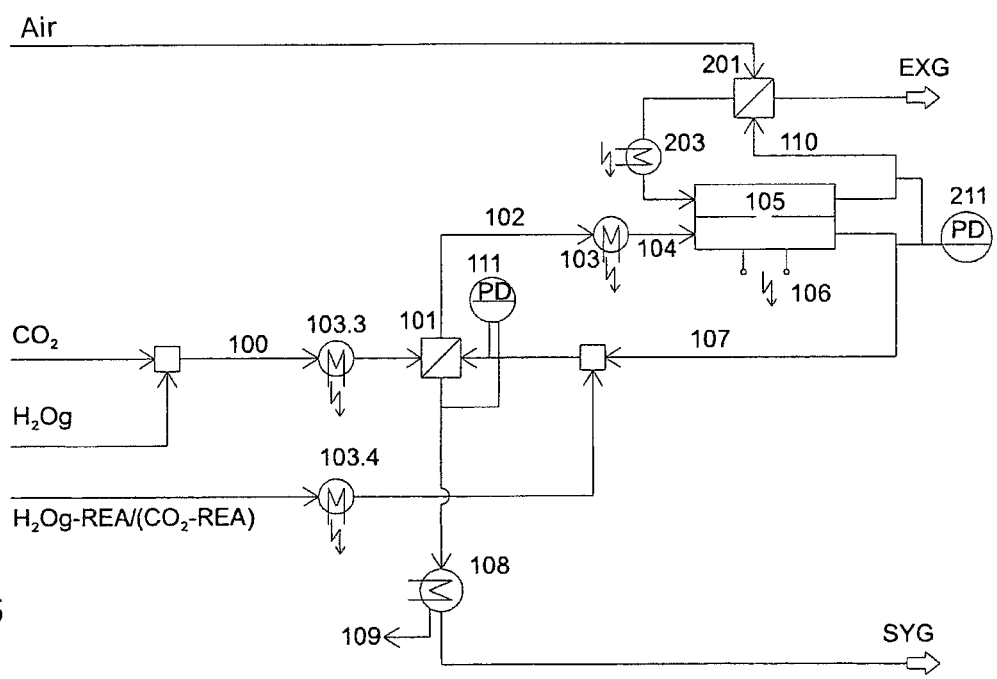
Figure 7:
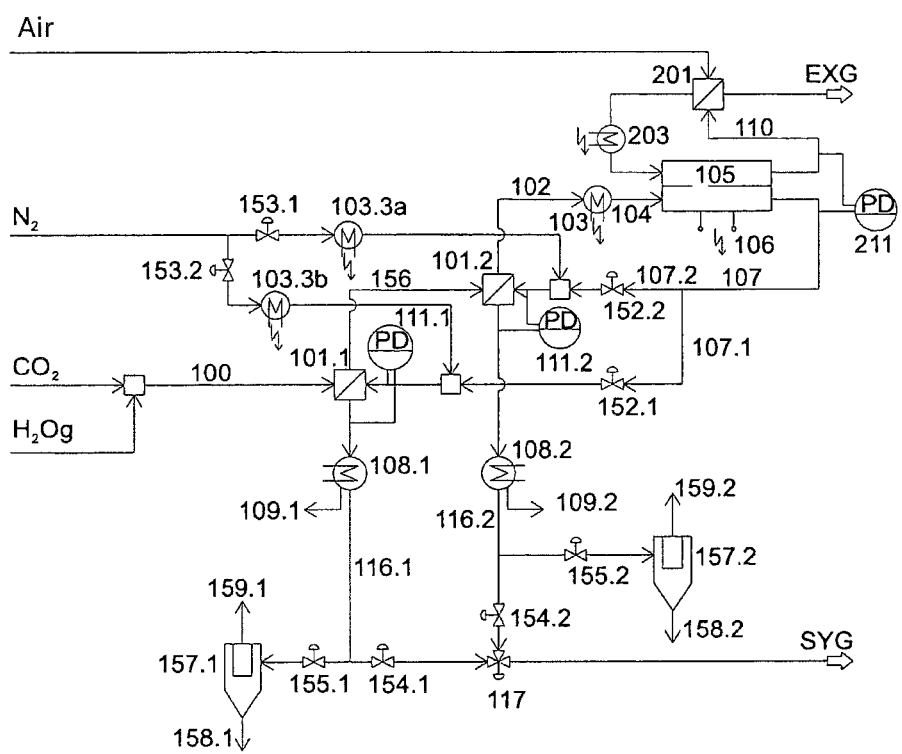

Hereinafter, embodiments of the invention will be described in detail with reference to the accompanying drawings in the description of the figures, which are intended to illustrate the invention and are not to be considered as limiting:

There is shown in:

FIG. 1 a schematic representation of a procedural set-up of the RWGS process;

FIG. 2 a possible procedural set-up of the co-electrolysis process;

FIG. 3 a possibility of soot removal by burning off the soot from a heat exchanger for synthesis gas cooling in a co-electrolysis process;

FIG. 4 a variant of the co-electrolysis process in which the soot burn-off can be carried out both during the synthesis gas operation and with interruption of the synthesis gas operation/soot burn-off with interruption of the synthesis gas operation;

FIG. 5 a process diagram for soot burning with and without interruption of synthesis gas operation in an RWGS process;

FIG. 6 a set-up of a co-electrolysis process, wherein the soot deposits from the synthesis gas cooling in the heat exchanger are removed by interrupting the cooling and increasing the temperature of the gas to be cooled;

FIG. 7 a co-electrolysis plant for the production of synthesis gas, in which the soot in the heat exchanger is cleaned out by soot blowing;

FIG. 8 the state of a synthesis gas at any point, for assessment of the risk of soot formation;

FIG. 9 the synthesis gas composition of an RWGS process as a function of equilibrium temperature at a pressure of 1 bar for a $H_2$—CO molar ratio of 2;

FIG. 10 the synthesis gas composition of an RWGS process as a function of equilibrium temperature at a pressure of 10 bar also with a $H_2$—CO molar ratio of 2;

FIG. 11 the course of the carbon activities of reactions R1, R2 and R3 starting from gas 1;

FIG. 12 the application of the steam mixture in the gas generation of the prior art; and FIGS. 13 to 16 state points of synthesis gases from co-electrolysis at different $H_2O/CO_2$ conversions.

The above-mentioned generation of the synthesis gas via the reverse water gas shift reaction, in short: RWGS, in an RWGS reactor, recuperative cooling and condensation according to the prior art, is being employed in practice by the applicant.

FIG. 1 shows a schematic representation of a procedural set-up of the RWGS process.

As feed gases for the RWGS process there is used carbon dioxide $CO_2$, hydrogen $H_2$, possibly residual gases from a Fischer-Tropsch synthesis SPG, containing the unreacted synthesis gas components carbon monoxide and hydrogen and carbon dioxide and low hydrocarbons, and steam $H_2Og$ (gas).

The feed gas mixture 1 is preheated in the recuperator 2 against the approximately 900 to 950° C. hot synthesis gas stream 6 and then fed as stream 3 to the electric energy operated heater 4.

In the heater 4, the gas mixture 3 is further heated and thereby fed so much heat that in the subsequent catalytic reactor 5, the endothermic reverse water gas shift reaction (RWGS reaction)

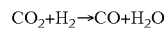

$$CO_2+H_2 \rightarrow CO+H_2O \quad \quad R4$$

and the endothermic reforming reactions (for example)

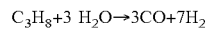

$$C_3H_8+3\ H_2O \rightarrow 3CO+7H_2 \quad \quad R5$$

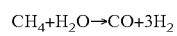

$$CH_4+H_2O \rightarrow CO+3H_2 \quad \quad R6$$

take place. The gas cools down.

Since the amount of heat that can be supplied in the heater 4 is limited due to the maximum permissible temperature of the construction materials used, it may be necessary, in order to achieve a certain synthesis gas quality in the synthesis gas 6, to provide a plurality of heater-reactor combinations 4 and 5.

The about 900 to 950° C. hot synthesis gas 6 is recuperatively cooled in the heat exchanger 2 against the feed gas 1 to be heated and then in the final cooler 7 which is operated with cooling water. During the cooling of the synthesis gas, water of reaction can condense out. The condensate 8 is discharged from the process.

During the cooling of the synthesis gas stream 6 in the heat exchanger 2, according to the reaction equations R1, R2 and R3, soot can form, which settles on the heat exchanger surface and impairs the heat transfer, so that less heat is available for heating the feed gas. This lack of heat must be additionally supplied by the electric heater 4, which reduces the efficiency of the process.

At the same time, the synthesis gas stream 6 is cooled less, which must be compensated by the final cooler 7.

The soot deposited in the heat exchanger 2 also clogs the gas channels in the heat exchanger. The thus increasing flow pressure loss is measured by the differential pressure measurement 9 and must be compensated by a higher pressure of the supplied feed gas streams $CO_2$, $H_2$, SPG and $H_2Og$. If this is not possible, the total quantity of feed gas must be reduced, which ultimately leads to a reduction in the output of the RWGS plant.

If the contamination of the heat exchanger with soot is too high, the process for cleaning or renewing the heat exchanger must be interrupted or completely shut down.

FIG. 2 shows a possible procedural circuit of the co-electrolysis process of the prior art.

The feed gases carbon dioxide $CO_2$ and steam $H_2Og$ are mixed and recuperatively preheated as gas mixture 100 in the heat exchanger 101 against the hot synthesis gas 107 to be cooled to the extent possible.

After the recuperative preheating, a further heating of the gas 102 to the inlet temperature in the electrolysis stack 105 of about 850° C. follows in the heater 103 operated with electric energy. In the electrolysis stack 105, the steam and the carbon dioxide of the gas mixture 104 are decomposed electrolytically into hydrogen and carbon monoxide as well as oxygen with the aid of electrical energy 106.

The electrolytic decomposition is not complete and the synthesis gas 107 leaving the stack 105 is largely in chemical equilibrium, so that in addition to hydrogen and carbon monoxide, steam, carbon dioxide and methane are also contained in the gas mixture 107. Typical $H_2O$ or $CO_2$ decomposition levels in SOC electrolyses are approximately 60-80%.

The synthesis gas 107, which has a temperature of approximately 850° C., is first recuperatively cooled in the heat exchanger 101 against the feed gas mixture 100 to be heated and then in the final cooler 108 operated with cooling water. The condensate 109 resulting from the cooling by condensation of the residual steam in the synthesis gas is discharged from the process.

The cooled synthesis gas SYG is supplied for subsequent use.

The electrolytically separated in the electrolysis stack 105 oxygen is on the anode side of the stack of purge air preheated in the recuperator 201 against the cooled oxygen-air mixture 110 and then reheated in the electric heater 203 to about 850° C., removed and after cooling discharged in the recuperator 201 as exhaust gas EXG to the atmosphere.

During the cooling of the synthesis gas 107 in the heat exchanger 101, the gas enters the soot area and soot is produced.

Deposits of soot during the cooling of the gas 107 in the heat exchanger 101 increases the pressure loss 111 via the heat exchanger 101 on the synthesis gas side. Thus, the differential pressure 211 between the anode and cathode side of the electrolysis stack 105 increases, which can lead to the breakage of individual cells and thus to performance losses and total failure of the co-electrolysis system.

The following describes measures to eliminate soot deposits in heat exchangers for synthesis gas cooling (soot removal).

FIG. 3 shows a possibility of soot removal by burning off the soot from a heat exchanger for synthesis gas cooling in a co-electrolysis process (soot burning off with interruption of the synthesis gas operation (co-SOC)). For soot removal according to this variant, the synthesis gas production process must be interrupted.

Instead of carbon dioxide $CO_2$ and steam $H_2Og$, purge nitrogen $N_2$ is added via the respective gas paths and then mixed to stream 100-$N_2$. The purge gas 100-$N_2$ is intended to prevent the oxidizing agent 141 from flowing backward through the electrolyzer stack 105 to burn off the soot in the heat exchanger 101.

The ignition temperature of soot is approximately at a temperature of >600° C. In order to prevent that the ignition temperature is below this due to the introduction of the cold purge nitrogen 100-$N_2$ in the heat exchanger 101, the purge nitrogen 100-$N_2$ is first preheated in electric heater 103.3 to about 650° C. and then introduced into the heat exchanger 101, where further heating of the purge nitrogen is effected by the hot, nitrogen-oxidizing agent mixture 140 to be cooled.

The electrolyzer stack 105 should be kept at operating temperature during the burning off of soot and preferably not allowed to cool down, to allow rapid restart of the synthesis gas operation. Therefore, the preheated nitrogen stream 102-$N_2$ is heated in the electric heater 103 to the usual stack inlet temperature of about 850° C. The stack 105 itself is not powered by electricity.

Into the hot purge gas 107-$N_2$ after the stack 105 an oxidizing agent 141 is mixed, that is comprised of a mixture 142 of air air-Ox and $N_2$-Ox and was heated in the electric heater 103.4 to a temperature of >650° C., i.e. above the ignition temperature of soot.

The amount of air air-Ox is adjusted by the control valve 143 so that the oxygen content 144 in the gas mixture 140 before the heat exchanger 101 is so high that during complete combustion of the soot in the heat exchanger 101 the combustion temperature does not exceed the maximum permissible temperature in the heat exchanger 101.

As it flows through the heat exchanger 101, the oxygen of the oxidizing agent-nitrogen mixture 140 reacts with the soot carbon to carbon dioxide and carbon monoxide, which can be seen in the gas analysis 145 in the stream SYG-EXG after the final cooling 108. Since no steam forms during the soot burn-off, also no condensate 109 accumulates in the final cooling 108.

The purging air for the anode side of the stack 105, the heat exchanger 201 and the electric heater 203 are operated as in normal operation. The goal is to keep the stack 105 at approximate operating temperature.

FIG. 4 shows a variant of the co-electrolysis process in which the burning off of soot can be performed both during the synthesis gas operation and with interruption of the synthesis gas operation (soot burning with and without interrupting the synthesis gas operation (co-SOC)). For this purpose, two separate heat exchangers 101.1 and 101.2 are necessary for the recuperative preheating of the feed gases $CO_2$ and $H_2Og$ against the substreams of the hot synthesis gas 107.1 and 107.2.

First, the normal operation for the production of synthesis gas will be described.

Carbon dioxide $CO_2$ and steam $H_2Og$ are recuperatively heated separately in the heat exchangers 101.1 and 101.2 against the partial streams 107.1 and 107.2 of the approximately 850° C. synthesis gas 107 from the stack 105.

After the recuperative heating of carbon dioxide and steam, both streams 102.1 and 102.2 are combined into stream 102 and heated in the electric heater 103 to a stack inlet temperature of about 850° C.

In the electrolysis stack 105, the steam and the carbon dioxide of the gas mixture 104 are decomposed electrolytically into hydrogen and carbon monoxide and oxygen with the aid of electrical energy 106.

The electrolytic decomposition is not complete and the synthesis gas 107 leaving the stack 105 is largely in chemical equilibrium, so that in addition to hydrogen and carbon monoxide, steam, carbon dioxide and methane are also contained in the gas mixture 107.

The approximately 850° C. hot synthesis gas 107 is divided into the two streams 107.1 and 107.2 and first in the heat exchangers 101.1 and 101.2 recuperatively cooled against the heated feed gas streams $CO_2$ and $H_2Og$ and then cooled with final coolers 108.1 and 108.2 operated with cooling water. The condensate 109.1 and 109.2 resulting form the cooling by condensation of the residual steam in the synthesis gas is released from the process.

The cooled gas streams 116.1 and 116.2 are combined in the control valve 117 to the synthesis gas flow SYG and fed to the subsequent process.

The regulation of the two partial streams 116.1 and 116.2 takes place with the aid of the control valve 117 such that the temperatures 146.1 and 146.2 of the gas flows 147.1 and 147.2 after the heat exchangers 101.1 and 101.2 are approximately equal.

The oxygen electrolytically separated in the electrolysis stack 105 is, on the anode side of the stack, removed by purge air, which was preheated in the recuperator 201 against the to-be-cooled oxygen-air mixture 110 and then reheated in the electric heater 203 to about 850° C., and after cooling in the recuperator 201 is discharged as exhaust gas EXG to the atmosphere.

During the cooling of the synthesis gas streams 107.1 and 107.2 in the heat exchangers 101.1 and 101.2, the gas enters the soot area and soot is produced, which leads to the problems mentioned. The differential pressures 111.1 and 111.2 and the differential pressure 211 between the cathode and anode sides of the stack 105 increase.

The burning of soot without interruption of the synthesis gas operation is carried out as follows.

First, the soot deposits in the heat exchanger 101.2 are burned off.

The electric heater 103.3b is put into operation and heats the feed gas $H_2Og$ to a temperature >650° C., i.e. to a temperature above the ignition temperature of soot.

After opening the valve 148.2, first only carbon dioxide $CO_2$-Ox is mixed into the gas stream 147.2, which flows together with the synthesis gas 147.2 via the cooler 108.2 and the control valve 117 into the synthesis gas SYG. The valve 148.1 remains closed.

To heat the $CO_2$-Ox to a temperature >650° C., i.e. above the ignition temperature of soot, the electric heater 103.4b is put into operation.

Once the temperature of >650° C. in the stream $CO_2$-Ox is reached, the control valve 117 is slowly closed for the gas flow 107.2. Since at this time the synthesis gas flow 107.1 through the heat exchanger 101.1 and thus the pressure loss 111.1 increases, care must be taken that the differential pressure 211 does not exceed its maximum permissible value.

If the control valve 117 is completely closed for the gas stream 107.2, the entire synthesis gas 107 and the hot carbon dioxide $CO_2$-Ox stream flow backward through the heat exchanger 101.2, via the heat exchanger 101.1.

When the inlet and outlet temperatures of the gases around the heat exchanger 101.2 are >650° C., it is started to add air-Ox via the heater 103.4b into the pipeline of the gas stream 147.2 in addition to the flow $CO_2$-Ox. In this case, the oxygen concentration 149 in the $CO_2$-air mixture 150 is adjusted by means of the control valve 143 so that the combustion temperature of the soot and the synthesis gas 107 is not above the maximum allowable temperature.

The heating of the recuperator 101.2 can be accelerated and homogenized by an additional auxiliary electrical heating.

The $CO_2$-air mixture 150 flows backwards through the heat exchanger 101.2 and burns the soot stuck in the heat exchanger 101. The combustion gas from the soot combustion mixes with the synthesis gas 107 and flows out via the heat exchanger 101.1.

A successful burning off of soot is detectable by a further increase in the $CO_2$- or CO-concentration in the gas analysis 145 of the synthesis gas SYG.

If oxygen enters the synthesis gas stream 107.1 to the heat exchanger 101.1, synthesis gas is burned, which can be recognized by an increase in the temperature 151.1 in the gas stream 107.1. The burning off of soot in the heat exchanger 101.2 is thus finished.

The air flow air-Ox is closed and the control valve 117 is opened again for the gas flow 107.2. The electric heater 103.4b is turned off.

The synthesis gas 107.2 and the carbon dioxide $CO_2$-Ox flow off again via the cooler 108.2. The carbon dioxide flow $CO_2$-Ox can be turned off. The feed gas heater 103.3b is switched off. The valve 148.2 is closed.

In order to burn off soot in the heat exchanger 101.1, the feed gas heater 103.3 is put into operation for heating up the carbon dioxide $CO_2$ to a temperature of >650° C. The valve 148.1 is opened and the carbon dioxide stream $CO_2$-Ox is switched on. The electric heater 103.4a is in operation and heats the $CO_2$-Ox to >650° C. The heating of the recuperator can be accelerated and homogenized by an additional auxiliary electrical heater.

The further procedure is analogous to the procedure as in burning off of soot in the heat exchanger 101.1.

During the entire burning off of soot the synthesis gas production remains in operation. Due to the carbon dioxide and air supply, the $CO_2$ and $N_2$ concentration in synthesis gas SYG is slightly increased.

After the soot is burned off in both heat exchangers 101.1 and 101.2, the gas preheaters 103.3a, 103.3b, 103.4a and 103.4b are taken out of operation again. The valves 148.1 and 148.2 are closed.

In the following, the burning off of soot with interruption of the synthesis gas operation according to the set-up in FIG. 4 will be described. The extension of the numbering with "—$N_2$" indicates that the gas path is flowed through by $N_2$.

Via the feed gas feeds $CO_2$ (carbon dioxide) and $H_2Og$ (steam), instead of carbon dioxide and steam, purge nitrogen $N_2$ is added. The heaters 103.3a and 103.3b are put into operation and heat the purge nitrogen to a temperature >650° C., i.e. to above the ignition temperature of soot. The purge nitrogen is to prevent oxidizing agent from flowing backwards through the stack 105.

In the heat exchangers n 101.1 and 101.2, the preheated purge nitrogen streams are further warmed up against the nitrogen-oxidizing agent mixtures 107.1-$N_2$ and 107.2-$N_2$ to be cooled. In the heater 103, the combined purge nitrogen stream 102-$N_2$ is then reheated to an inlet temperature in the stack 105 of about 850° C. The stack 105 is maintained at an approximate operating temperature of 850° C. to rapidly return to synthesis gas mode after soot burn off.

The hot purge nitrogen 107-$N_2$ from the stack 105 is temperature (146.1 and 146.2) regulated by means of control valve 117 and distributed to the heat exchangers 101.1 and 101.2 (stream 107.1-$N_2$ and 107.2-$N_2$). After the final cooling in the coolers operated with cooling water 108.1 and 108.2, the streams 116.1-$N_2$ and 116.2-$N_2$ are reunited in the control valve 117 and discharged as stream SYG-EXG.

Next, the valve 148.2 is opened and in place of carbon dioxide $CO_2$-Ox $N_2$-Ox is mixed in the gas stream 147.2-$N_2$. Nitrogen should be used instead of carbon dioxide, because it enables a better detection of soot burn-off with the gas analysis 145 in the gas stream SYG-EXG.

The nitrogen $N_2$-Ox is heated in the heater 103.4b to a temperature >650° C., i.e. above the ignition temperature of soot.

Once the preheating temperature of >650° C. has been reached, the control valve 117 for the gas flow 107.2-$N_2$ is slowly closed. The purge nitrogen 107.2-$N_2$ decreases and is discharged together with the stream 107.1-$N_2$ via the heat exchanger 101.1. At this time, the pressure loss 111.1 through the heat exchanger 101.1 and the differential pressure 211 through the stack 105 increase. Care must be taken that the differential pressure 211 does not exceed its maximum permissible value.

If the control valve 117 for the gas flow 107.2-$N_2$ is closed, the entire purge nitrogen 107-$N_2$ and the nitrogen flow $N_2$-Ox flow off through the heat exchanger 101.1.

When the inlet and outlet temperatures of the gases around the heat exchangers 101.1 and 101.2 are >650° C., supplemental to the $N_2$ flow there is started an introduction of $N_2$-Ox air-Ox via the heater 103.4b into the pipeline of the gas flow 147.2-$N_2$. The oxygen concentration 149 in the gas mixture 150-$N_2$ is adjusted by means of the control valve 143 so that the combustion temperature of the soot is not above the maximum allowable temperature.

With the air supply, the soot is reacted with the oxygen of the oxidizing agent mixture 150 in the heat exchanger 101.2 and is combusted. In the gas analysis 145 of the exhaust gas stream SYG-EXG, the carbon dioxide and possibly also the carbon monoxide concentration increases.

If the soot is burned in the heat exchanger 101.2, the unused oxygen passes through the gas path 107.1-$N_2$ into the heat exchanger 101.1 and burns the soot there. The soot burn-off in both heat exchangers n 101.1 and 101.2 is ended when the $CO_2$ and CO concentration in the gas analysis 145 in the gas SYG-EXG approaches zero and the oxygen concentration in the gas analysis 145 increases.

The burning off of soot with interruption of the synthesis gas operation corresponding to FIG. 4 also works when the oxidizing agent 150 is introduced into the gas stream 147.1 $N_{-2}$ rather than in the gas stream 147.2 $N_2$.

After completion of burning off of soot the air-Ox is turned off and the control valve 117 for the gas stream 107.2-$N_2$ is opened, the heaters 103.4b, 103.3a and 103.3b taken out of service and the nitrogen $N_2$-Ox turned off. Subsequently, the purge nitrogen $N_2$ in the gas paths $CO_2$ and $H_2Og$ is replaced by again by the feed gases $CO_2$ and $H_2Og$ for the synthesis gas operation.

FIG. 5 shows the process scheme for soot burning with and without interruption of synthesis gas operation in an RWGS process. The procedure is the same as during soot burning in a co-electrolysis process and therefore need not be described separately.

As already described, soot deposits from the synthesis gas cooling in the heat exchanger can also be removed by interrupting the cooling and increasing the temperature of the gas to be cooled. In FIG. 6 the set-up of a co-electrolysis process is shown, which allows such a form of soot removal from the heat exchanger (off-reacting soot with and without additional steam/$CO_2$ (co-SOC)).

The newly added heater 103.3 in the feed gas mixed stream 100 is intended to heat the feed gas to a temperature of about 850° C. or higher, so that the synthesis gas stream 107 is no longer cooled in the heat exchanger 101.

The missing cooling capacity for the gas flow 107 has to be taken over by the final cooler 108. Soot deposits in the final cooler have not been observed so far. The reason for this is presumably that the condensate formed during the cooling from the residual water content of the gas 107 "washes" the heat exchanger surface free of soot again and again.

Due to the higher temperature of the gas 107 in the heat exchanger 101, the gas is able to convert the soot carbon to carbon monoxide and hydrogen by reversing the soot formation reactions R1 and R2 with the residual carbon dioxide and steam contents.

By supplying additional steam $H_2Og$-REA, carbon dioxide $CO_2$-REA or a mixture of both, which has been preheated in the electric heater 103.4 to a temperature of about 850° C. or higher, into the gas stream 107, soot off-reaction can be assisted and be accelerated.

The feed gas stream 100 and the additional gas stream $H_2Og$-REA/$CO_2$-REA are electrically heated in order to ensure high temperatures throughout the heat exchanger, which make it possible to react off soot that has formed. The steam/$CO_2$ supply is only in operation during the soot removal period.

The heating of the recuperator can be accelerated and homogenized by an additional auxiliary electrical heater.

For the reacting off of soot the driving style of co-electrolysis can supplementally be changed briefly. Due to a lower degree of conversion in the stack 105, higher concentrations of $H_2O$-steam and carbon dioxide are contained in the gas 107, which support soot degradation.

FIG. 7 shows a co-electrolysis plant for the production of synthesis gas, in which the soot in the heat exchanger is cleaned by sootblowing (sootblowing).

The carbon dioxide $CO_2$ and steam $H_2Og$ feed gases are mixed to form the gas stream 100 and then recuperatively preheated in the heat exchanger 101.1 against the synthesis gas stream 107.1 to be cooled.

The valves 152.2, 153.1, 153.2, 154.2, 155.1 and 155.2 are closed. The valves 152.1 and 154.1 are open. The 3-way valve 117 is opened downstream of the cooler 108.1 for the outflowing, cooled synthesis gas 116.1, so that it can leave the process as gas SYG.

The recuperatively preheated feed gas mixture 156 after the heat exchanger 101.1 flows through the heat exchanger 101.2, which is however initially flowed through by no gas on the cooling side.

After the heat exchanger 101.2 a further increase in temperature of the gas 102 to about 850° C. takes place in the electric heater 103. In the electrolysis stack 105, the $CO_2$ and the $H_2O$-steam are electrolytically decomposed into carbon monoxide and hydrogen with electric energy 106.

The anode side of the stack 105 is purged with purge air as in the state of the art.

If the pressure loss 111.1 in the heat exchanger 101.1 increases as a result of soot deposits, the differential pressure 211 between the cathode and anode sides of the electrolysis stack 105 also increases.

If the pressure loss 111.1 has reached a predetermined maximum value, the valves 152.2 and 154.2 are opened and the 3-way valve 117 slowly converts the gas path 107 from 107.1 to 107.2. This means that the gas mixture 100 is less preheated in the heat exchanger 101.1 and more and more in the heat exchanger 101.2. The synthesis gas 107 finally flows off via the gas path 107.2, 116.2 and SYG.

The valves 152.1 and 154.1 are closed.

In order to free the heat exchanger 101.1 from soot, the valves 155.1 and 153.2 are opened. Via the gas path $N_2$, an $O_2$-free purge gas, for example nitrogen, enters in the heat exchanger 101.1, which is preheated by means of the electric heater 103.3 b to about 150° C., to avoid condensation of steam in the heat exchanger 101.1 on the heating side.

Since the valve 152.1 is closed and the heat exchanger 101.1 is thus separated from the process, the heat exchanger 101.1 can be flushed with the aid of the purge gas $N_2$ without influencing the pressure of the process, and thus also not the differential pressure 211, and thus be freed from soot. The soot-containing purge gas passes through the open valve 155.1 into a gas filter 157.1, in which the soot 158.1 is deposited. The purified exhaust gas 159.1 is released to the atmosphere.

If the cleaning of the heat exchanger 101.1 is completed, the gas flow $N_2$ and the heater 103.3b are turned off and the valves 153.2 and 155.1 are closed.

The cleaning of the heat exchanger 101.2 is analogous to the heat exchanger 101.1.

If the pressure loss 111.2 in the heat exchanger 101.2 increases as a result of soot deposits, the differential pressure 211 between the cathode and anode sides of the electrolysis stack also increases.

If the pressure loss 111.2 has reached a predetermined maximum value, the valves 152.1 and 154.1 are opened and the 3-way valve 117 slowly converts the gas path 107 from 107.2 to 107.1. This means that the gas mixture 100 is preheated more and more in the heat exchanger 101.1 and less and less in the heat exchanger 101.2. The synthesis gas 107 finally flows off via the gas path 107.1, 116.1 and SYG.

The valves 152.2 and 154.2 are closed.

In order to free the heat exchanger 101.2 from soot, the valves 153.1 and 155.2 are opened and an $O_2$-free purge gas, for example nitrogen, is introduced in the heat exchanger 101.2 via the gas path $N_2$, is preheated my means of the electric heater 103.3a to about 800° C. in order to avoid cooling in the heat exchanger 101.2 of the feed gas 156 already heated in the heat exchanger 101.1.

Since the valve 152.2 is closed and the heat exchanger 101.2 is thus separated from the process, the heat exchanger 101.2 can be flushed with the help of the purge nitrogen $N_2$ without influencing the pressure of the process, and thus the differential pressure 211, and thus be freed from soot. The soot-containing purge gas passes through the open valve 155.2 into a gas filter 157.2, in which the soot 158.2 is deposited. The purified exhaust gas 159.2 is released to the atmosphere.

If the cleaning of the heat exchanger 101.2 is finished, the gas flow $N_2$ and the heater 103.3a are turned off and the valves 153.1 and 155.2 are closed.

The procedure just described may also vary somewhat. Thus, for example, the transition from one heat exchanger to the other via the 3-way valve 117 can take place without first reaching a maximum predetermined value for the pressure losses 111.1 or 111.2, but rather can be carried out continuously with increasing pressure loss.

LIST OF REFERENCE NUMBERS

Air-Ox air for oxidizing agent
Air purge air
$CO_2$ carbon dioxide
$CO_2$-Ox carbon dioxide for oxidizing agent
$CO_2$-REA carbon dioxide for the off-reaction/blowing out of soot
EXG exhaust
$H_2$ hydrogen
$H_2$Og steam
$H_2$Og-REA steam to react/blow out soot
$N_2$ purge nitrogen
$N_2$-Ox nitrogen for oxidizing agent
SPG synthesis purge gas
SYG synthesis gas
SYG-EXG exhaust gas in the SYG gas line
feed gas mixture RWGS
1.1 partial stream of feed gas mixture RWGS
1.2 partial stream of feed gas mixture RWGS
2 recuperator RWGS
2.1 recuperator for partial cooling of the synthesis gas RWGS
2.2 recuperator for partial cooling of the synthesis gas RWGS
3 hot feed gas stream RWGS
3.1 hot feed gas partial stream RWGS
3.2 hot feed gas partial stream RWGS
4 electric heater RWGS
4.1 electric heater for preheating a partial feedgas stream RWGS
4.2 electric heater for preheating a partial feedgas stream RWGS
5 catalytic reactor RWGS
6 hot synthesis gas RWGS
6.1 hot partial stream synthesis gas RWGS
6.2 hot partial stream synthesis gas RWGS
7 final coolers RWGS
7.1 final cooler in the synthesis gas partial stream RWGS
7.2 final cooler in the synthesis gas partial stream RWG
8 condensate RWGS
8.1 condensate from the synthesis gas partial stream RWGS
8.2 condensate from the synthesis gas partial stream RWGS
9 differential pressure measurement RWGS
9.1 differential pressure measurement in the synthesis gas partial stream RWGS
9.2 differential pressure measurement in the synthesis gas partial stream RWGS
16.1 temperature measurement in the hot synthesis gas partial stream RWGS
16.2 temperature measurement in the hot synthesis gas stream RWGS
100 feed gas mixture co-electrolysis
100-$N_2$ $N_2$ purge gas mixture co-electrolysis
101 recuperator co-electrolysis
101.1 recuperator co-electrolysis for partial cooling of the synthesis gas
101.2 recuperator co-electrolysis for partial cooling of the synthesis gas
102 preheated feed gas co-electrolysis
102-1 preheated feed gas $CO_2$ co-electrolysis
102-2 preheated feed gas $H_2$Og co-electrolysis
102-$N_2$ preheated $N_2$ purge gas co-electrolysis
103 electric heater feedgas co-electrolysis
103.3 electric heater for preheating feed gas before recuperator co-electrolysis
103.3a electric heater for preheating partial stream of feed gas ($CO_2$/mixture) before recuperator co-electrolysis
103.3b electric heater for preheating partial stream of feed gas ($H_2$ Og/mixture) before recuperator co-electrolysis
103.4 electric heater for preheating oxidizing agent or reactant before recuperator co-electrolysis
103.4a electric heater preheating oxidizing agent co-electrolysis
103.4b electric heater preheating oxidizing agent co-electrolysis
104 hot feed gas co-electrolysis
104-$N_2$ hot $N_2$-purge gas co-electrolysis
105 co-electrolysis stack
106 electric energy co-electrolysis
107 hot synthesis gas co-electrolysis
107.1 partial stream of hot synthesis gas co-electrolysis
107.2 partial stream of hot synthesis gas co-electrolysis
107-$N_2$ hot $N_2$ purge gas after stack co-electrolysis
108 final cooler co-electrolysis
108.1 final cooler co-electrolysis for partial stream
108.2 final cooler co-electrolysis for partial stream
109 condensate co-electrolysis
109.1 condensate co-electrolysis partial stream
109.2 condensate co-electrolysis partial stream
110 oxygen-air mixture co-electrolysis
111 differential pressure measurement recuperator co-electrolysis
111.1 differential pressure measurement in synthesis gas partial stream co-electrolysis
111.2 differential pressure measurement in synthesis gas partial stream co-electrolysis
116.1 synthesis gas partial stream after final cooler co-electrolysis 116.2 synthesis gas partial stream after final cooler co-electrolysis
117 three-way valve
118 circulating hydrogen
140 $N_2$ oxidizing agent mixture co-electrolysis
141 oxidizing agent hot co-electrolysis
142 oxidizing agent cold co-electrolysis
143 control valve for setting the $O_2$ concentration
144 gas analysis for measuring the $O_2$ content in the $N_2$-oxidizing agent mixture co-electrolysis
145 gas analysis for measuring the CO, $CO_2$ and $O_2$ content in the SYG or SYG-EXG
146.1 temperature measurement in the cooled partial stream synthesis gas co-electrolysis
146.2 temperature measurement in the cooled partial stream synthesis gas co-electrolysis
147.1 partial stream of synthesis gas after heat exchanger co-electrolysis
147.2 partial stream of synthesis gas after heat exchanger co-electrolysis
148.1 shut-off valve oxidizing agent co-electrolysis
148.2 shut-off valve oxidizing agent co-electrolysis
149 gas analyzer for measuring the $O_2$ content in the air-Ox-$CO_2$—OX mixture
150 air-Ox-$CO_2$-Ox mixture co-electrolysis
151.1 temperature measurement in the hot synthesis gas partial stream co-electrolysis
151.2 temperature measurement in the hot synthesis gas partial stream co-electrolysis
152.1 shut-off valve partial stream of synthesis gas hot
152.2 shut-off valve partial stream of synthesis gas hot
153.1 shut-off valve partial stream of purge gas
153.2 shut-off valve partial stream of purge gas
154.1 shut-off valve partial stream of synthesis gas cold
154.2 shut-off valve partial stream of synthesis gas cold
155.1 shut-off valve blow-by line partial stream synthesis gas cold
155.2 shut-off valve blow-by line partial stream synthesis gas cold
156 recuperatively preheated feed gas mixture
157.1 gas filter synthetic gas line 1 co-electrolysis
157.2 gas filter synthetic gas line 2 co-electrolysis
158.1 soot synthesis gas line 1 co-electrolysis
158.2 soot synthesis gas line 2 co-electrolysis
159.1 exhaust gas synthesis line 1 co-electrolysis
159.2 exhaust gas synthesis line 1 co-electrolysis
201 recuperator co-electrolysis, exhaust side
203 electric heater air co-electrolysis
211 differential pressure measurement anode-cathode stack co-electrolysis

The invention claimed is:

1. A soot removal process inside a synthesis gas-production apparatus using electrical energy in a synthesis gas operation having at least one electrolysis stack and at least first and second recuperators connected in parallel, each recuperator having a cooling side and a heating side, the cooling side for transferring thermal energy from CO-containing gas produced in the electrolysis stack and the heating side for receiving the transferred thermal energy, the process comprising:
    introducing CO-containing gas produced in the electrolysis stack into the cooling side of the first and second recuperators,
    introducing a feed gas stream comprising at least one of carbon dioxide and steam into the heating side of the first and second recuperators and heating said feed gas stream by transfer of thermal energy from the cooling side of the first and the second recuperators,
    removing deposited soot from the cooling side of the first recuperator by temporarily operating the first recuperator in a soot removal operation by interrupting the flow of CO-containing gas from the electrolysis stack through the first recuperator, while continuing the flow of CO-containing gas from the electrolysis stack through the second recuperator such that synthesis gas operation is not interrupted in the electrolysis stack,
    heating the first recuperator by feeding into the cooling side at least one of a $CO_2$ containing gas and an oxygen containing gas stream heated to an ignition temperature of soot by means of a temporarily connectable additional heater,
    reacting the soot deposits in the first recuperator with said at least one of a heated $CO_2$-containing gas and oxygen containing gas stream flowing through the cooling side of the recuperator in an opposite direction to the flow direction during synthesis gas operation, and
    supplying the reaction gas of the soot removal operation from the cooling side of the first recuperator to the cooling side of the parallel arranged second recuperator.

2. The soot removal process according to claim 1, wherein a control valve is provided which is adapted to completely close a gas flow of one of the recuperators.

3. The soot removal process according to claim 2, wherein the control valve regulates the two partial streams such that the temperatures of the parallel gas flows are approximately equal after the recuperators.

4. The soot removal process according to claim 1, wherein the temporarily connectable additional heater heats the $CO_2$/air-containing gas to a temperature above the ignition temperature of soot.

5. The soot removal process according to claim 1, wherein in synthesis gas operation the synthesis gas is divided into two streams and in that each of the streams is recuperatively cooled against feed gas streams of $CO_2$ and $H_2Og$ and then cooled with final coolers operating with cooling water.

* * * * *